United States Patent
Zhou et al.

(10) Patent No.: US 12,483,958 B2
(45) Date of Patent: Nov. 25, 2025

(54) BEAM-SPECIFIC KEY PERFORMANCE INDICATOR INDICATION FOR SERVING NODE SELECTION

(71) Applicant: QUALCOMM Incorporated, San Diego, CA (US)

(72) Inventors: Yan Zhou, San Diego, CA (US); Qian Zhang, Basking Ridge, NJ (US); Peter Gaal, San Diego, CA (US); Tao Luo, San Diego, CA (US); Juan Montojo, San Diego, CA (US); Junyi Li, Fairless Hills, PA (US); Sony Akkarakaran, Poway, CA (US)

(73) Assignee: Qualcomm Incorporated, San Diego, CA (US)

( * ) Notice: Subject to any disclaimer, the term of this patent is extended or adjusted under 35 U.S.C. 154(b) by 82 days.

(21) Appl. No.: 17/481,890

(22) Filed: Sep. 22, 2021

(65) Prior Publication Data

US 2023/0091614 A1   Mar. 23, 2023

(51) Int. Cl.
*H04W 36/26*    (2009.01)
*H04B 7/08*     (2006.01)
*H04W 72/543*   (2023.01)

(52) U.S. Cl.
CPC ............ *H04W 36/26* (2013.01); *H04B 7/088* (2013.01); *H04W 72/543* (2023.01)

(58) Field of Classification Search
CPC ...... H04B 7/088; H04B 7/022; H04B 7/0617; H04B 7/0695; H04W 36/26; H04W 72/087; H04W 72/543; H04W 36/0085
See application file for complete search history.

(56) References Cited

U.S. PATENT DOCUMENTS

| | | | |
|---|---|---|---|
| 10,390,235 B2 | 8/2019 | Faxér et al. | |
| 2012/0052828 A1* | 3/2012 | Kamel | H04B 17/104 455/226.2 |

(Continued)

FOREIGN PATENT DOCUMENTS

WO    WO-2020155051 A1    8/2020

OTHER PUBLICATIONS

Partial International Search Report—PCT/US2022/038332—ISA/EPO—Nov. 4, 2022 (2106306WO).

(Continued)

*Primary Examiner* — Ivan O Latorre
(74) *Attorney, Agent, or Firm* — Holland & Hart LLP

(57) ABSTRACT

Methods, systems, and devices for wireless communications are described. For example, a communication device may receive control signaling (e.g., a broadcasted control signal) from another communication device. The control signaling may indicate beam information for one or more beams of a set of beams. The one or more beams may correspond to the serving cell or one or more neighboring cells. The beam information may include one or more metrics associated with each of the one or more beams. As such, the communication device may determine that a metric associated with each of the one or more beams satisfies a threshold, select the beam, and communicate using the selected beam. In some other examples, the beam-specific information may include beam measurement offsets for one or more beams. In such examples, the communication device may select a beam based on the beam measurement offsets and perform communications using the selected beam.

30 Claims, 16 Drawing Sheets

(56) References Cited

U.S. PATENT DOCUMENTS

| | | | | |
|---|---|---|---|---|
| 2013/0051364 | A1* | 2/2013 | Seol | H04W 16/28 |
| | | | | 370/329 |
| 2014/0073329 | A1* | 3/2014 | Kang | H04W 36/30 |
| | | | | 455/439 |
| 2018/0020363 | A1* | 1/2018 | Faxér | H04B 7/024 |
| 2018/0124766 | A1* | 5/2018 | Nagaraja | H04W 72/046 |
| 2018/0331739 | A1* | 11/2018 | Nilsson | H04B 7/0408 |
| 2018/0352461 | A1* | 12/2018 | Guirguis | H04B 7/0695 |
| 2019/0068270 | A1* | 2/2019 | Schenk | H04B 7/0695 |
| 2019/0239233 | A1* | 8/2019 | Ryu | H04W 72/046 |
| 2019/0349830 | A1* | 11/2019 | Peisa | H04W 36/085 |
| 2020/0037385 | A1* | 1/2020 | Park | H04W 56/001 |
| 2020/0162952 | A1* | 5/2020 | Yu | H04B 7/0695 |
| 2020/0252847 | A1* | 8/2020 | Park | H04W 88/14 |
| 2021/0058131 | A1* | 2/2021 | Zhu | H04B 7/063 |
| 2021/0168678 | A1* | 6/2021 | Deenoo | H04W 76/19 |
| 2021/0184739 | A1* | 6/2021 | Sang | H04L 5/0048 |
| 2021/0258941 | A1* | 8/2021 | Chou | H04W 72/542 |
| 2021/0288696 | A1* | 9/2021 | Jung | H04B 7/0626 |
| 2021/0376902 | A1* | 12/2021 | Burström | H04B 7/0695 |
| 2021/0391897 | A1* | 12/2021 | Wang | H04B 7/024 |
| 2022/0078848 | A1* | 3/2022 | Hu | H04W 72/046 |
| 2022/0231883 | A1* | 7/2022 | Chou | H04B 7/088 |
| 2022/0368393 | A1* | 11/2022 | Lee | H04B 7/0634 |

OTHER PUBLICATIONS

International Search Report and Written Opinion—PCT/US2022/038332—ISA/EPO—Jan. 2, 2023.

* cited by examiner

BEAM-SPECIFIC KEY PERFORMANCE INDICATOR INDICATION FOR SERVING NODE SELECTION

FIELD OF TECHNOLOGY

The following relates to wireless communications, including techniques for providing beam-specific key performance indicator (KPI).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems may support handover and cell re-selection procedures to accommodate changing conditions in geographic coverage areas (also referred to as cells) throughout the network. In some examples, a communication device (e.g., a base station or a UE) may communicate cell information to other communication devices (e.g., UEs) operating within the network to facilitate such procedures.

SUMMARY

Various aspects of the present disclosure relate to beam-specific KPI indication. Multiple communication devices may support beamformed wireless communications. For example, a communication device (e.g., a UE) may receive control signaling from another communication device (e.g., a base station or a relay UE). The control signaling may indicate beam information for one or more beams of a set of beams. The one or more beams may correspond to the serving cell (e.g., the cell served by the base station or relay UE) or one or more neighboring cells (e.g., one or more cells served by other base stations or other relay UEs). In some examples, the beam information may include one or more metrics associated with each of the one or more beams. In such examples, the communication device may determine that a metric associated with each of the one or more beams satisfies a threshold. The communication device may then select a beam, from the one or more beams, and communicate using the selected beam. In some other examples, the beam-specific information may include beam measurement offsets for one or more beams. In such examples, the communication device may select a beam based on the beam measurement offsets and perform communications using the selected beam. The present disclosure may therefore promote higher reliability and lower latency wireless communications, among other benefits.

A method for wireless communication at a first device is described. The method may include receiving, from a second device, control signaling indicating beam information for each beam of a set of beams associated with a cell, the beam information including a set of beam performance metrics associated with each beam of the set of beams associated with the cell, determining that at least one beam performance metric of the set of beam performance metrics associated with a beam satisfies a threshold, selecting the beam of the set of beams for the wireless communication with the cell based on the at least one beam performance metric satisfying the threshold, and communicating using the selected beam of the set of beams.

An apparatus for wireless communication at a first device is described. The apparatus may include a processor, memory coupled with the processor, and instructions stored in the memory. The instructions may be executable by the processor to cause the apparatus to receive, from a second device, control signaling indicating beam information for each beam of a set of beams associated with a cell, the beam information including a set of beam performance metrics associated with each beam of the set of beams associated with the cell, determine that at least one beam performance metric of the set of beam performance metrics associated with a beam satisfies a threshold, select the beam of the set of beams for the wireless communication with the cell based on the at least one beam performance metric satisfying the threshold, and communicate using the selected beam of the set of beams.

Another apparatus for wireless communication at a first device is described. The apparatus may include means for receiving, from a second device, control signaling indicating beam information for each beam of a set of beams associated with a cell, the beam information including a set of beam performance metrics associated with each beam of the set of beams associated with the cell, means for determining that at least one beam performance metric of the set of beam performance metrics associated with a beam satisfies a threshold, means for selecting the beam of the set of beams for the wireless communication with the cell based on the at least one beam performance metric satisfying the threshold, and means for communicating using the selected beam of the set of beams.

A non-transitory computer-readable medium storing code for wireless communication at a first device is described. The code may include instructions executable by a processor to receive, from a second device, control signaling indicating beam information for each beam of a set of beams associated with a cell, the beam information including a set of beam performance metrics associated with each beam of the set of beams associated with the cell, determine that at least one beam performance metric of the set of beam performance metrics associated with a beam satisfies a threshold, select the beam of the set of beams for the wireless communication with the cell based on the at least one beam performance metric satisfying the threshold, and communicate using the selected beam of the set of beams.

Some examples of the method, apparatuses, and non-transitory computer-readable medium described herein may further include operations, features, means, or instructions for receiving, from the second device, second control signaling indicating transmission-reception point (TRP) information for each TRP of a set of TRPs, the TRP information including a set of TRP metrics associated with each TRP of the set of TRPs, at least one TRP metric of the set of TRP metrics satisfying the threshold, where selecting the beam of the set of beams for the wireless communication may be based on the received second control signaling.

Some examples of the method, apparatuses, and non-transitory computer-readable medium described herein may further include operations, features, means, or instructions for receiving, from the second device, third control signaling indicating an association between each beam of the set of beams and each TRP of the set of TRPs.

Some examples of the method, apparatuses, and non-transitory computer-readable medium described herein may further include operations, features, means, or instructions for determining a latency metric for each beam of the set of beams based on the set of beam performance metrics associated with each beam of the set of beams and where selecting the beam of the set of beams for the wireless communication may be based on determining the latency metric for each beam of the set of beams.

In some examples of the method, apparatuses, and non-transitory computer-readable medium described herein, the latency metric includes a delay for one or both of a downlink or an uplink between the first device and the second device.

Some examples of the method, apparatuses, and non-transitory computer-readable medium described herein may further include operations, features, means, or instructions for determining a throughput metric for each beam of the set of beams based on the set of beam performance metrics associated with each beam of the set of beams and where selecting the beam of the set of beams for the wireless communication may be based on determining the throughput metric for each beam of the set of beams.

In some examples of the method, apparatuses, and non-transitory computer-readable medium described herein, the throughput metric includes a throughput for one or both of a downlink or an uplink between the first device and the second device.

Some examples of the method, apparatuses, and non-transitory computer-readable medium described herein may further include operations, features, means, or instructions for determining a resource usage for each beam of the set of beams based on the set of beam performance metrics associated with each beam of the set of beams and where selecting the beam of the set of beams for the wireless communication may be based on determining the resource usage for each beam of the set of beams.

In some examples of the method, apparatuses, and non-transitory computer-readable medium described herein, the resource usage includes one or more of a number of protocol data unit sessions, an average number of protocol data unit sessions, a protocol data unit establishment time, or an average number of successful registration updates.

Some examples of the method, apparatuses, and non-transitory computer-readable medium described herein may further include operations, features, means, or instructions for determining a mobility metric for each beam of the set of beams based on the set of beam performance metrics associated with each beam of the set of beams and where selecting the beam of the set of beams for the wireless communication may be based on determining the mobility metric for each beam of the set of beams.

In some examples of the method, apparatuses, and non-transitory computer-readable medium described herein, the mobility metric includes one or more of a handover success rate, an average time of handover, or a rate of mobility registration updates.

Some examples of the method, apparatuses, and non-transitory computer-readable medium described herein may further include operations, features, means, or instructions for determining a higher layer reliability metric for each beam of the set of beams based on the set of beam performance metrics associated with each beam of the set of beams and where selecting the beam of the set of beams for the wireless communication may be based on determining the higher layer reliability metric for each beam of the set of beams.

In some examples of the method, apparatuses, and non-transitory computer-readable medium described herein, the higher layer reliability metric includes one or both of a quality-of-service reliability or a data radio bearer reliability.

Some examples of the method, apparatuses, and non-transitory computer-readable medium described herein may further include operations, features, means, or instructions for determining an energy efficiency metric for each beam of the set of beams based on the set of beam performance metrics associated with each beam of the set of beams and where selecting the beam of the set of beams for the wireless communication may be based on determining the energy efficiency metric for each beam of the set of beams.

Some examples of the method, apparatuses, and non-transitory computer-readable medium described herein may further include operations, features, means, or instructions for determining a physical layer reliability metric for each beam of the set of beams based on the set of beam performance metrics associated with each beam of the set of beams and where selecting the beam of the set of beams for the wireless communication may be based on determining the physical layer reliability metric for each beam of the set of beams.

In some examples of the method, apparatuses, and non-transitory computer-readable medium described herein, the physical layer reliability metric includes an average number of transmission.

Some examples of the method, apparatuses, and non-transitory computer-readable medium described herein may further include operations, features, means, or instructions for determining an over-the-air load metric for each beam of the set of beams based on the set of beam performance metrics associated with each beam of the set of beams and where selecting the beam of the set of beams for the wireless communication may be based on determining the over-the-air load metric for each beam of the set of beams.

In some examples of the method, apparatuses, and non-transitory computer-readable medium described herein, the over-the-air load metric includes one or both of a number of devices served by the respective beam or a ratio of utilized time resources to utilized frequency resources.

In some examples of the method, apparatuses, and non-transitory computer-readable medium described herein, the control signaling indicates beam information for the respective beam used to transmit the control signaling, a beam different from the respective beam, or both.

In some examples of the method, apparatuses, and non-transitory computer-readable medium described herein, the control signaling includes a broadcast control signal received at the first device.

A method for wireless communication at a first device is described. The method may include receiving, from a second device, control signaling indicating beam information for each beam of a set of beams, the beam information including a respective beam measurement offset associated with each beam of the set of beams, selecting a beam of the set of beams of a cell for the wireless communication based on the received control signaling, and communicating using the selected beam of the set of beams.

An apparatus for wireless communication at a first device is described. The apparatus may include a processor, memory coupled with the processor, and instructions stored in the memory. The instructions may be executable by the processor to cause the apparatus to receive, from a second device, control signaling indicating beam information for each beam of a set of beams, the beam information including a respective beam measurement offset associated with each beam of the set of beams, select a beam of the set of beams of a cell for the wireless communication based on the received control signaling, and communicate using the selected beam of the set of beams.

Another apparatus for wireless communication at a first device is described. The apparatus may include means for receiving, from a second device, control signaling indicating beam information for each beam of a set of beams, the beam information including a respective beam measurement offset associated with each beam of the set of beams, means for selecting a beam of the set of beams of a cell for the wireless communication based on the received control signaling, and means for communicating using the selected beam of the set of beams.

A non-transitory computer-readable medium storing code for wireless communication at a first device is described. The code may include instructions executable by a processor to receive, from a second device, control signaling indicating beam information for each beam of a set of beams, the beam information including a respective beam measurement offset associated with each beam of the set of beams, select a beam of the set of beams of a cell for the wireless communication based on the received control signaling, and communicate using the selected beam of the set of beams.

Some examples of the method, apparatuses, and non-transitory computer-readable medium described herein may further include operations, features, means, or instructions for receiving, from the second device, second control signaling indicating TRP information for each TRP of a set of TRPs, the TRP information including a respective TRP measurement offset associated with each TRP of the set of TRPs and where selecting the beam of the set of beams for the wireless communication may be based on the received second control signaling.

Some examples of the method, apparatuses, and non-transitory computer-readable medium described herein may further include operations, features, means, or instructions for receiving, from the second device, third control signaling indicating an association between each beam of the set of beams and each TRP of the set of TRPs and where communicating the wireless communication may be based on the received third control signaling.

Some examples of the method, apparatuses, and non-transitory computer-readable medium described herein may further include operations, features, means, or instructions for determining, based on the beam information, that one or more beams of the set of beams may be associated with a neighboring cell, the neighboring cell includes the cell and where selecting the beam of the set of beams for the wireless communication may be based on determining that a measurement value associated with a respective beam of the one or more beams associated with the neighboring cell satisfies a criterion, the measurement value may be based on a beam measurement offset associated with the respective beam of the neighboring cell.

Some examples of the method, apparatuses, and non-transitory computer-readable medium described herein may further include operations, features, means, or instructions for establishing a connection with the neighboring cell based on determining that the measurement value associated with the respective beam of the one or more beams associated with the neighboring cell satisfies the criterion and where communicating the wireless communication may be based on the established connection with the neighboring cell.

In some examples of the method, apparatuses, and non-transitory computer-readable medium described herein, the measurement value includes at least one of a reference signal received power value, a reference signal received quality value, or a signal to interference plus noise ratio value. In some examples of the method, apparatuses, and non-transitory computer-readable medium described herein, the control signaling includes a system information block.

In some examples of the method, apparatuses, and non-transitory computer-readable medium described herein, selecting the beam of the set of beams for the wireless communication may include operations, features, means, or instructions for selecting a beam associated with a neighboring cell based on the beam information triggering a handover procedure and determining that a beam measurement offset corresponding to the beam associated with the neighboring cell satisfies a threshold, the neighboring cell including the cell.

Some examples of the method, apparatuses, and non-transitory computer-readable medium described herein may further include operations, features, means, or instructions for performing the handover procedure based on the selected beam being associated with the neighboring cell and where communicating the wireless communication may be based on performing the handover procedure.

A method for wireless communication at a second device is described. The method may include transmitting, to a first device, control signaling indicating beam information for each beam of a set of beams associated with a cell, the beam information including a set of beam performance metrics associated with each beam of the set of beams associated with the cell, where at least one beam performance metric of the set of beam performance metrics associated with a beam satisfies a threshold.

An apparatus for wireless communication at a second device is described. The apparatus may include a processor, memory coupled with the processor, and instructions stored in the memory. The instructions may be executable by the processor to cause the apparatus to transmit, to a first device, control signaling indicating beam information for each beam of a set of beams associated with a cell, the beam information including a set of beam performance metrics associated with each beam of the set of beams associated with the cell, where at least one beam performance metric of the set of beam performance metrics associated with a beam satisfies a threshold, and communicating using at least one beam of the set of beams based at least in part on the transmitted control signaling.

Another apparatus for wireless communication at a second device is described. The apparatus may include means for transmitting, to a first device, control signaling indicating beam information for each beam of a set of beams associated with a cell, the beam information including a set of beam performance metrics associated with each beam of the set of beams associated with the cell, where at least one beam performance metric of the set of beam performance metrics associated with a beam satisfies a threshold, and communicating using at least one beam of the set of beams based at least in part on the transmitted control signaling.

A non-transitory computer-readable medium storing code for wireless communication at a second device is described. The code may include instructions executable by a processor to transmit, to a first device, control signaling indicating beam information for each beam of a set of beams associated with a cell, the beam information including a set of beam performance metrics associated with each beam of the set of beams associated with the cell, where at least one beam performance metric of the set of beam performance metrics associated with a beam satisfies a threshold, and communicating using at least one beam of the set of beams based at least in part on the transmitted control signaling.

Some examples of the method, apparatuses, and non-transitory computer-readable medium described herein may further include operations, features, means, or instructions for transmitting, to the first device, second control signaling indicating TRP information for each TRP of a set of TRPs, the TRP information including a set of TRP metrics associated with each TRP of the set of TRPs, at least one TRP metric of the set of TRP metrics satisfying the threshold.

Some examples of the method, apparatuses, and non-transitory computer-readable medium described herein may further include operations, features, means, or instructions for transmitting, to the first device, third control signaling indicating an association between each beam of the set of beams and each TRP of the set of TRPs.

In some examples of the method, apparatuses, and non-transitory computer-readable medium described herein, each beam of the set of beams may be associated with a latency metric for the respective beam.

In some examples of the method, apparatuses, and non-transitory computer-readable medium described herein, the latency metric includes a delay for one or both of a downlink or an uplink between the first device and the second device.

In some examples of the method, apparatuses, and non-transitory computer-readable medium described herein, each beam of the set of beams may be associated with a throughput metric for the respective beam.

In some examples of the method, apparatuses, and non-transitory computer-readable medium described herein, the throughput metric includes a throughput for one or both of a downlink or an uplink between the first device and the second device.

In some examples of the method, apparatuses, and non-transitory computer-readable medium described herein, each beam of the set of beams may be associated with a resource usage for the respective beam.

In some examples of the method, apparatuses, and non-transitory computer-readable medium described herein, the resource usage includes one or more of a number of protocol data unit sessions, an average number of protocol data unit sessions, a protocol data unit establishment time, or an average number of successful registration updates.

In some examples of the method, apparatuses, and non-transitory computer-readable medium described herein, each beam of the set of beams may be associated with a mobility metric for the respective beam.

In some examples of the method, apparatuses, and non-transitory computer-readable medium described herein, the mobility metric includes one or more of a handover success rate, an average time of handover, or a rate of mobility registration updates.

In some examples of the method, apparatuses, and non-transitory computer-readable medium described herein, each beam of the set of beams may be associated with a higher layer reliability metric for the respective beam.

In some examples of the method, apparatuses, and non-transitory computer-readable medium described herein, the higher layer reliability metric includes one or both of a quality-of-service reliability or a data radio bearer reliability.

In some examples of the method, apparatuses, and non-transitory computer-readable medium described herein, each beam of the set of beams may be associated with an energy efficiency metric for the respective beam.

In some examples of the method, apparatuses, and non-transitory computer-readable medium described herein, each beam of the set of beams may be associated with a physical layer reliability metric for the respective beam.

In some examples of the method, apparatuses, and non-transitory computer-readable medium described herein, the physical layer reliability metric includes an average number of transmission.

In some examples of the method, apparatuses, and non-transitory computer-readable medium described herein, each beam of the set of beams may be associated with an over-the-air load metric for the respective beam.

In some examples of the method, apparatuses, and non-transitory computer-readable medium described herein, the over-the-air load metric includes one or both of a number of devices served by the respective beam or a ratio of utilized time resources to utilized frequency resources.

In some examples of the method, apparatuses, and non-transitory computer-readable medium described herein, the control signaling indicates beam information for the respective beam used to transmit the control signaling, a beam different from the respective beam, or both. In some examples of the method, apparatuses, and non-transitory computer-readable medium described herein, the control signaling includes a broadcast control signal broadcasted to the first device.

A method for wireless communication at a second device is described. The method may include transmitting, to a first device, control signaling indicating beam information for each beam of a set of beams, the beam information including a respective beam measurement offset associated with each beam of the set of beams.

An apparatus for wireless communication at a second device is described. The apparatus may include a processor, memory coupled with the processor, and instructions stored in the memory. The instructions may be executable by the processor to cause the apparatus to transmit, to a first device, control signaling indicating beam information for each beam of a set of beams, the beam information including a respective beam measurement offset associated with each beam of the set of beams, and communicating using at least one beam of the set of beams based at least in part on the transmitted control signaling.

Another apparatus for wireless communication at a second device is described. The apparatus may include means for transmitting, to a first device, control signaling indicating beam information for each beam of a set of beams, the beam information including a respective beam measurement offset associated with each beam of the set of beams, and communicating using at least one beam of the set of beams based at least in part on the transmitted control signaling.

A non-transitory computer-readable medium storing code for wireless communication at a second device is described. The code may include instructions executable by a processor to transmit, to a first device, control signaling indicating beam information for each beam of a set of beams, the beam information including a respective beam measurement offset associated with each beam of the set of beams, and communicating using at least one beam of the set of beams based at least in part on the transmitted control signaling.

Some examples of the method, apparatuses, and non-transitory computer-readable medium described herein may further include operations, features, means, or instructions for transmitting, to the first device, second control signaling indicating TRP information for each TRP of a set of TRPs, the TRP information including a respective TRP measurement offset associated with each TRP of the set of TRPs.

Some examples of the method, apparatuses, and non-transitory computer-readable medium described herein may further include operations, features, means, or instructions for transmitting, to the first device, third control signaling indicating an association between each beam of the set of beams and each TRP of the set of TRPs.

In some examples of the method, apparatuses, and non-transitory computer-readable medium described herein, one or more beams of the set of beams may be associated with a neighboring cell and a measurement value associated with a respective beam of the one or more beams associated with the neighboring cell satisfies a criterion, the measurement value may be based on a beam measurement offset associated with the respective beam of the neighboring cell.

Some examples of the method, apparatuses, and non-transitory computer-readable medium described herein may further include operations, features, means, or instructions for releasing a connection with the first device based on the measurement value associated with the respective beam of the one or more beams associated with the neighboring cell satisfying the criterion. In some examples of the method, apparatuses, and non-transitory computer-readable medium described herein, the measurement value includes at least one of a reference signal received power value, a reference signal received quality value, or a signal to interference plus noise ratio value.

Some examples of the method, apparatuses, and non-transitory computer-readable medium described herein may further include operations, features, means, or instructions for performing a handover procedure based on the measurement value associated with the respective beam of the one or more beams associated with the neighboring cell satisfying the criterion. In some examples of the method, apparatuses, and non-transitory computer-readable medium described herein, the control signaling includes a system information block.

DETAILED DESCRIPTION

Figure 1:
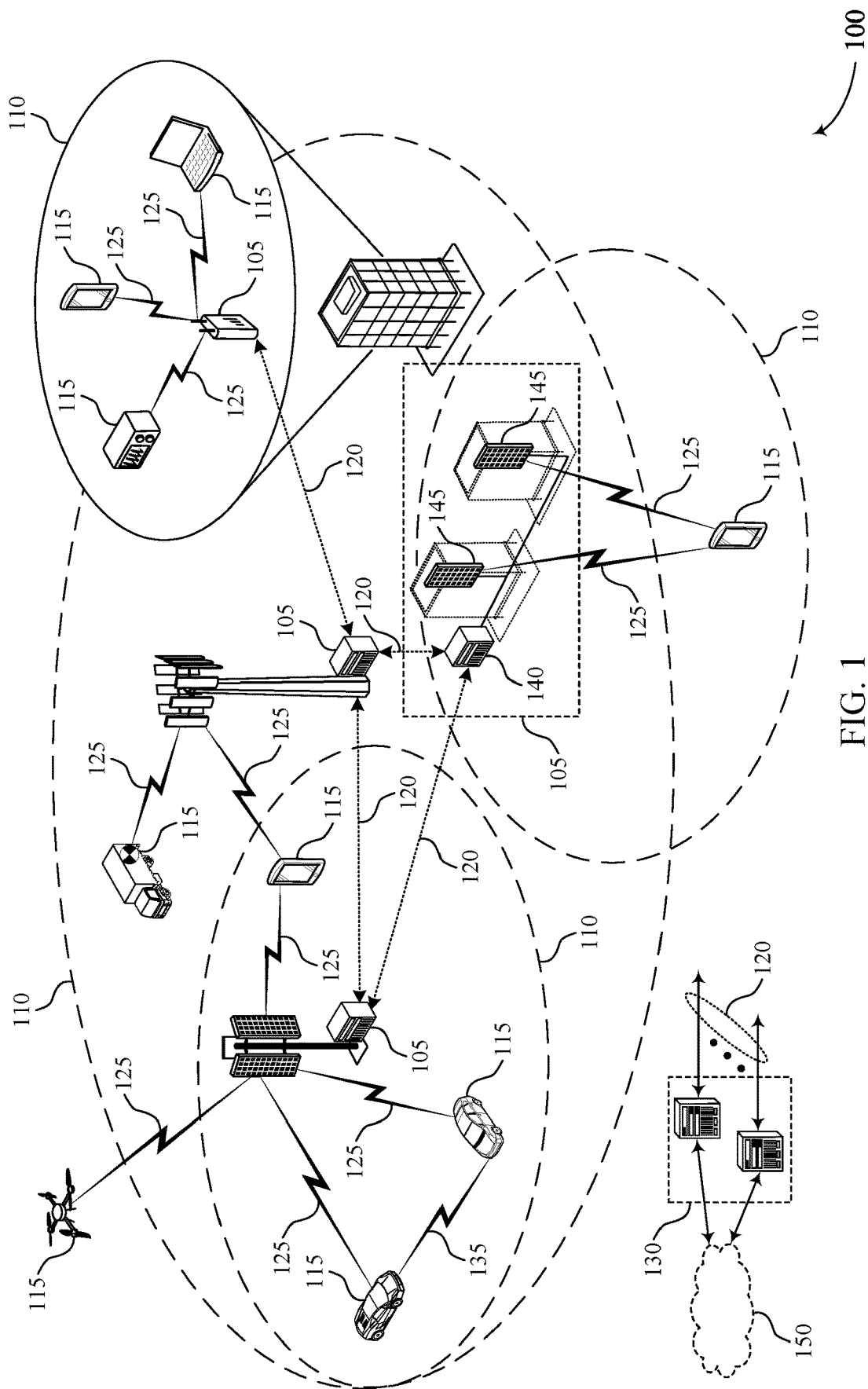
FIGS. 1 through 3 each illustrate an example of a wireless communications system that supports beam-specific KPI indication for serving node selection in accordance with aspects of the present disclosure.

In some wireless communications systems, a communication device (e.g., a serving node) may provide a geographic coverage area, also referred to as a cell, over which other communication devices (e.g., served nodes) may perform beamformed wireless communication with the serving node. In some examples, the serving node (e.g., a base station or a UE) and the served node (e.g., a UE) may support beamformed wireless communication via another communication device (e.g., a relay UE). For example, a relay UE may relay beamformed wireless communications between the base station and other UEs operating within the cell. A UE operating within the cell may undergo a handover procedure in which the UE may release or drop an existing connection with the source cell (e.g., the cell served by the base station or relay UE) to establish a connection with a target cell (e.g., a cell served another base station or another relay UE operating within the network). In some other examples, the UE may be operating in an idle mode and may perform a cell selection procedure in which the UE establishes (e.g., or re-establishes) a connection with the cell providing a highest channel quality (e.g., a highest receive power level or the lowest interference level) amongst candidate cells within the network.

To facilitate handover and cell selection procedures, communication devices (e.g., base stations or UEs) may broadcast information (e.g., performance metrics) associated with beamformed wireless communications between communication devices operating within the cell. For example, between a serving node (e.g., a base station or a relay UE) and served nodes (e.g., UEs) operating within the cell. However, the information provided by the base station or relay UE may reflect the collective performance of all the beams within the cell (e.g., may be cell-specific) and, as such, may not reflect the performance of individual beams within the cell. Accordingly, UEs operating within the cell may perform unnecessary cell re-selection or handover procedures. For example, rather than switching a beam for the beamformed wireless communication with the base station or the relay UE, the UE may switch cells. Therefore, it may be desirable for the base station or the relay UE to share information associated with individual beams (e.g., beam-specific information), rather than cell-specific information, to improve beamformed wireless communications within the network.

Various aspects of the present disclosure provide techniques for beam-specific KPI indication. For example, a base station or a relay UE may share beam-specific information with UEs operating within a wireless communications network. A base station or relay UE may broadcast beam-specific information, such as key performance indicators (e.g., latency information, throughput information, and the like) or measurement offsets, to other UEs operating within the cell. The beam-specific information may facilitate cell re-selection or handover procedures for the UEs. For example, the beam-specific information (e.g., compared to cell-specific information) may enable UEs operating within the cell to determine if a beam within the cell may provide increased performance or if a cell re-selection or handover procedure may be beneficial to the UE. Additionally or alternatively, rather than providing beam-specific information, a base station or relay UE may provide information associated with individual transmission-reception points (TRPs), also referred to as TRP-specific information. In some examples, beam-specific and TRP-specific information may improve beamformed wireless communications and prevent UEs from performing unnecessary cell re-selection or handover procedures.

Aspects of the disclosure are initially described in the context of wireless communications systems. Aspects of the disclosure are further illustrated by and described with reference to process flows, apparatus diagrams, system diagrams, and flowcharts that relate to beam-specific KPI indication for serving node selection.

FIG. 1 illustrates an example of a wireless communications system 100 that supports beam-specific KPI indication for serving node selection in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling.

The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data.

Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

For example, a UE 115 may receive control signaling from a base station 105 (e.g., or a relay UE 115). The control signaling may indicate beam information for one or more beams associated with the serving cell (e.g., the cell served by the base station) or one or more neighboring cells (e.g., one or more cells served by other base stations or other relay UEs). The beam information may include metrics associated with each of the beams and the UE 115 may determine that a metric associated with each of the beams satisfies a threshold. The UE 115 may then select a beam, from the one or more beams, and communicate using the selected beam. In some examples, the beam-specific information may include beam measurement offsets for each of the beams. In such examples, the UE 115 may select a beam based on the beam measurement offsets and then perform communications using the selected beam. The present disclosure may therefore promote higher reliability and lower latency wireless communications, among other benefits.

Figure 2:
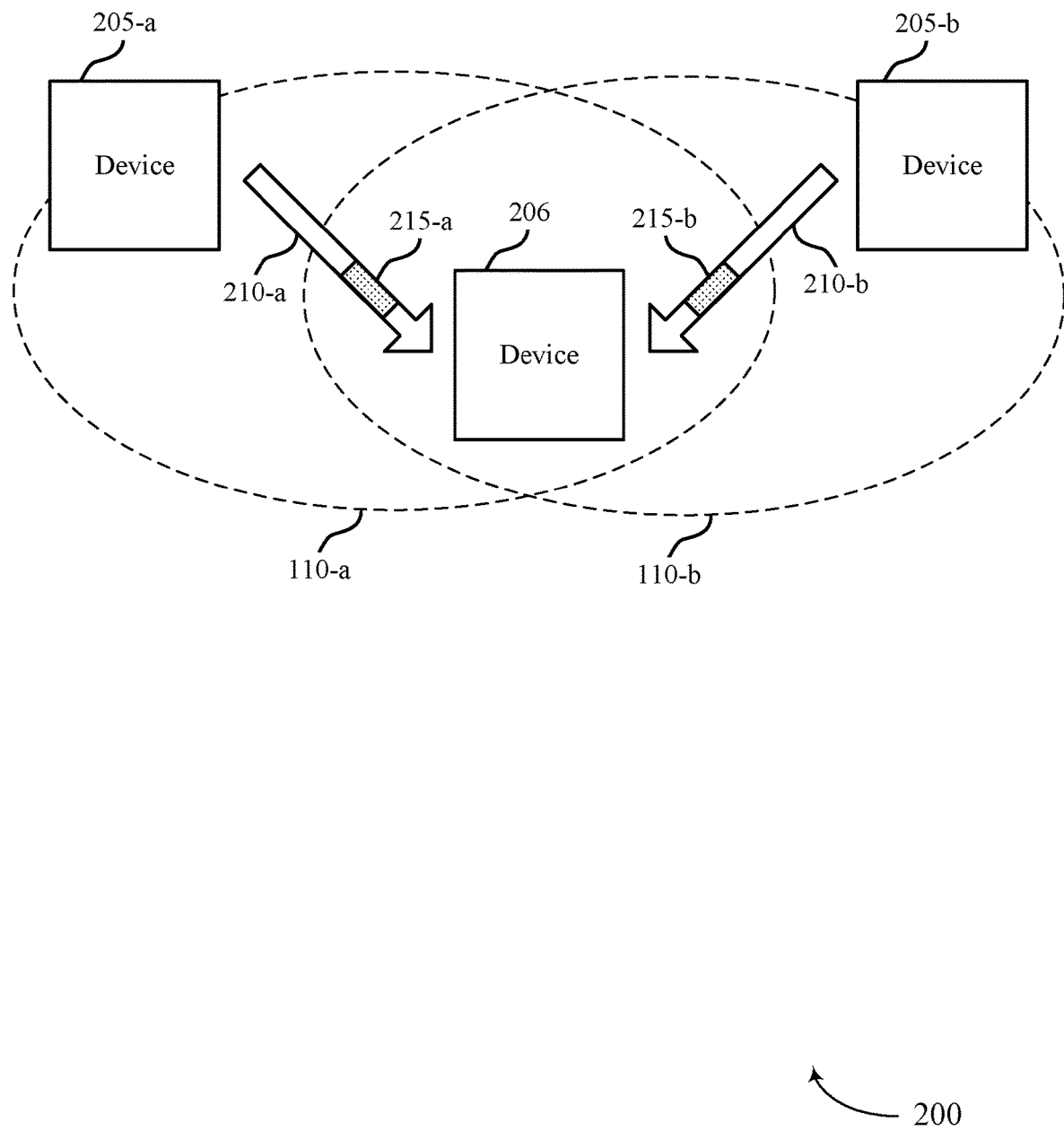

FIG. 2 illustrates an example of a wireless communications system 200 that supports beam-specific KPI indication for serving node selection in accordance with aspects of the present disclosure. In some examples, the wireless communications system 200 may implement aspects of the wireless communications system 100. For example, the wireless communications system 200 may include a device 205-*a*, a device 205-*b*, and a device 206, which may be examples of devices described with reference to FIG. 1. In the example of FIG. 2, the device 205-*a* and the device 205-*b* may be serving nodes (e.g., a base station 105 a relay UE 115) whereas the device 206 may be a served node (e.g., a UE 115). The device 205-*a* and the device 205-*b* may support wired or wireless communications within a geographic coverage area 110-*a* and a geographic coverage area 110-*b*, respectively. The geographic coverage area 110-*a* and the geographic coverage area 110-*b* may be examples of a geographic coverage area 110 described with reference to FIG. 1. The device 205-*a* may communicate with the device 206 via a communication link 210-*a* and the device 205-*b* may communicate with the device 206 via a communication link 210-*b*. In the example of FIG. 2, the communication links 210 may be downlinks.

In some cases, the devices 205 may broadcast cell-specific information (e.g., performance metrics) associated with beamformed wireless communications between the respective devices 205 and the device 206 (e.g., or other devices 206, not shown). For example, the devices 205 may broadcast cell-specific KPIs to facilitate cell selection by one or more devices 206 operating within the network (e.g., devices 206 served by the same cell or by other cells within the network). The cell-specific KPIs may include latency and throughout related information that may reflect the experience of one or more devices 206 operating on the corresponding cell. The device 206 may use cell-specific KPIs received from one of the devices 205 to select a cell, amongst other candidate cells (e.g., cells with similar receive power levels), with the highest throughput or lowest latency for handover (e.g., conditional handover) or cell selection (e.g., idle cell re-selection) procedures.

Additionally or alternatively, the devices 206 may broadcast cell-specific measurement offsets, such as through the q-OffsetCell instruction element (IE), for one or more neighboring cells (e.g., cells associated with other devices 205) to facilitate idle cell reselection. For example, the device 206 may apply a cell-specific measurement offset (e.g., the value of a cell-specific measurement offset) associated with a neighboring cell to one or more metrics, such as reference signal received power (RSRP), reference signal received quality (RSRQ), or signal to interference plus noise ratio (SINR), to determine which cell (e.g., amongst all candidate cells) may provide a highest channel quality (e.g., a highest RSRP value, a highest RSRQ value, or a highest SINR value). In some examples, if a neighboring cell is determined to have a higher channel quality than the serving cell, the device 206 (e.g., a service seeking node) may establish a connection with the neighboring cell.

However, because cell-specific KPIs and cell-specific measurement offsets may not reflect the performance of individual beams within the cell, the device 206 may perform unnecessary cell re-selection or a handover procedures. Therefore, to prevent unnecessary cell re-selection or handover procedures, the device 205-*a* or the device 205-*b* (e.g., a serving node) may broadcast beam-specific information, such as beam-specific KPIs or beam-specific measurement offsets to the device 206 (e.g., and other device 206, not shown) operating within the network. For example, the device 206 may receive control signaling from the device 205-*a* (e.g., a base station or a relay UE) or the device (e.g., another base station or another relay UE). The control signaling may indicate beam information (e.g., beam information 215) for one or more beams, and the one or more beams may correspond to the serving cell or one or more neighboring cells.

In some examples, the beam information 215 may include one or more metrics (e.g., beam-specific KPIs) associated with each of the one or more beams. In such examples, the device 206 may determine that a beam-specific KPI associated with each of the one or more beams satisfies a threshold (e.g., may provide a suitable channel quality). The device 206 may select a beam, from the one or more beams which may provide a suitable channel quality, and communicate using the selected beam. In some other examples, the beam-specific information 215 may include beam-specific measurement offsets for one or more beams. In such examples, the device 206 may select a beam based on the beam-specific measurement offsets and perform communications using the selected beam. In some examples, beam-specific information, such as beam-specific KPIs or beam-specific measurement offsets, may improve wireless communications for the device 206.

Figure 3:
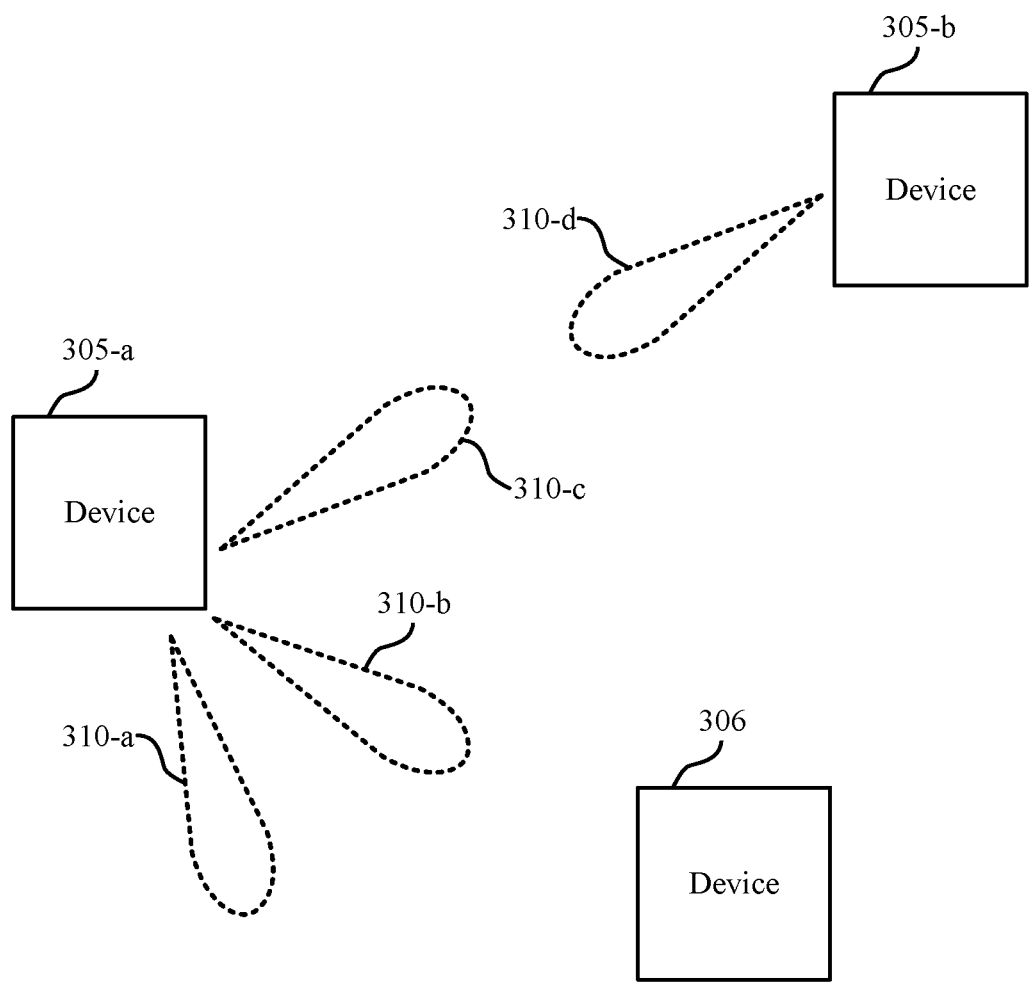

FIG. 3 illustrates an example of a wireless communications system 300 that supports beam-specific KPI indication for serving node selection in accordance with aspects of the present disclosure. In some examples, the wireless communications system 300 may implement aspects of the wireless communications systems 100 and 200. For instance, the wireless communications system 300 may include a device 305-*a*, a device 305-*b*, and device 306, which may be examples of devices described with reference to FIGS. 1 and 2. In the example of FIG. 3, the device 305-*a* and the device 305-*b* may be serving nodes (e.g., a base station 105 a relay UE 115) whereas the device 306 may be a served node (e.g., a UE 115).

In some examples, a serving node (e.g., the device 305-*a*) may support beamformed wireless communications for the device 306 or one or more other communication devices (e.g., one or more other devices 306, not shown) via one or more beams 310. In some examples, the number of devices 306 served by a beam 310 may be more or less than the number of devices served by other beams 310 of the cell. As such, the devices 306 served by different beams of the device 305-*a* may experience different throughput or latency. As a concrete example, the number of device 306 served by a beam 310-*a* may be higher than the number of devices 306 served by a beam 310-*b*. As such, the number of resources available through the beam 310-*b* may be lower than the number of available resources available through the beam 310-*a* (e.g., due to the increased number of devices sharing resources). Accordingly, the latency associated with communications via the beam 310-*b* may also be less. Therefore, KPIs may not be similar (e.g., identical) across different beams of the device 305-*a*.

In some other examples, the device 305-*a* may relay beamformed wireless communications between the device 305-*b* and the device 306. In some examples, the device 305-*a* may transmit data and receive data on partially or fully overlapped resources. Stated alternatively, the device 306 may be a candidate sidelink relay UE capable of performing full-duplex relay. For example, the device 305-*a* may use different pairs of transmit and receive beams (e.g., beam-pairs) to relay communications between other communication devices. For example, the device 305-*a* receive communications from the device 305-*b* via a beam 310-*c* (e.g., via a backhaul link) and transmit the communications to one or more devices 306 via the beam 310-*a* or the beam 310-*b* (e.g., via an access link). In another example, the device 305-*a* may receive communications via the beam 310-*b* (e.g., via an access link) and transmit the communications via the beam 310-*a* (e.g., another access link).

In some examples, the device 305-*a* may not provide suitable full-duplex relay and, as such, some beam-pairs may provide higher throughput and lower latency than other beam-pairs of the cell. For example, backhaul communications via beam 310-*c* may cause self-interference at the device 305-*a* and, as such, the beam-pair formed by the beam 310-*b* and the 310-*c* may not provide suitable full-duplex. Therefore, KPIs broadcast by the device 305-*a* may indicate higher throughput and lower latency for the beam 310-*a* than the beam 310-*b*. In yet another example, different antenna arrays at the device 305-*a* may include a different number of antenna panels and, as such, may have different capabilities. For example, an antenna array (not shown) of the device 305-*a* may include a single antenna panel (e.g., may support two layers) and another antenna array (not shown) may include two antenna panels (e.g., may support four layers). As such, the beams associated with the different antenna arrays of the device 305-*a* may provide varying levels of performance and, accordingly, the KPIs of beams associated with different antenna arrays may be different.

Thus, to improve cell selection for service seeking nodes operating within the network (e.g., one or more devices 306), the service providing node (e.g., the device 305-*a*) may provide beam-specific information, such as beam-specific KPIs or beam-specific measurement offsets, rather than cell-specific information. The beam-specific information may be based on the performance of devices (e.g., devices 306) actively communicating within the cell (e.g., actively being served by the device 305-*a*). Therefore, the beam specific information may enable a device (e.g., the device 306) to predict an expected performance, for example if the device 306 is to be served by the beam.

The beam-specific KPIs may include one or more metrics associated with the performance of the corresponding beam. The one or more performance metrics may reflect the performance of commination devices (e.g., wireless nodes) operating within the network. As described herein, a wireless node may be an example of a base station 105 or a UE 115 as described throughout the disclosure, including with reference to FIGS. 1 and 2. In some examples, the beam-specific KPIs may include one or more latency performance metrics. A latency performance metric may correspond to a latency associated with downlink or uplink communications between a wireless node and a distributed unit of another wireless node (e.g., downlink or uplink delay in the distributed unit of wireless node of a subnetwork or a network slice subnet), downlink or uplink communications between a wireless node and a centralized unit of a wireless node (e.g., downlink or uplink delay in the network of a subnetwork or a network slice subnet), or downlink or uplink communications in an end-to-end network (e.g., an average downlink or uplink delay in a network slice).

Additionally or alternatively, the beam-specific KPIs may include one or more throughput performance metrics. A throughput performance metric may correspond to a downlink or uplink throughput, for example a downlink or uplink throughput for a cell (e.g., an NR cell), a sub-network, and a network slice subnet. Additionally or alternatively, the beam-specific KPIs may include one or more utilization (e.g., resource usage) performance metrics. A utilization performance metric may correspond to a mean number of protocol data unit (PDU) sessions of network and network slice instance, a virtualized resource utilization of network slice instance, a PDU session establishment time of network slice, a mean number of successful periodic registration updates of single network slice, or a maximum number of PDU sessions of network slice.

Additionally or alternatively, the beam-specific KPIs may include one or more mobility performance metrics. A mobility performance metric may correspond to a network handover success rate, a mean time of inter-wireless node handover execution of a network slice, a successful rate of mobility registration updates of a single network slice, or a handover success rate. Additionally or alternatively, the beam-specific KPIs may include one or more higher layer reliability performance metrics. A higher layer reliability performance metric may correspond to a quality-of-service flow reliability. For example, the higher layer reliability performance metrics may show how often an end-user loses (e.g., abnormally loses) a quality-of-service flow during the time in which the quality-of-service flow may be used. A higher layer reliability performance metric may also correspond to a data radio bearer reliability which shows how often an end-user abnormally loses a data radio bearer during the time the data radio bearer may be active.

Additionally or alternatively, the beam-specific KPIs may include one or more energy efficiency performance metrics. An energy efficiency performance metric may reflect the network energy consumption per transferred data bit. Additionally or alternatively, the beam-specific information may include one or more physical layer reliability performance metrics. A physical layer reliability performance metric may correspond to an average number of transmissions. Additionally or alternatively, the beam-specific KPIs may include one or more over-the-air load metrics. An over-the-air load metric may correspond to the number of UEs served by the corresponding beam, or the ratio of utilized time resources to utilized frequency resources. In some examples, the utilized time resources and the utilized frequency resources may be classified as elastic resource utilization (e.g., for eMBB traffic) or non-elastic resource utilization (e.g., for URLLC and fixed bit rate traffic). In some examples, the one or more performance metrics may be expressed by different statistics or with different granularity. For example, the one or more performance metrics may be expressed as an average value or a percentile per quality-of-service class (e.g., performance metric type).

In some examples, a wireless node may broadcast beam-specific measurement offsets to facilitate cell reselection and handover procedures. A wireless node (e.g., service seeking node) may apply a beam-specific measurement offsets to one or more measurement quantities (e.g., values) associated with the corresponding cell to determine whether a cell re-selection or handover procedure may be beneficial to the node. Thus, another wireless node (e.g., a serving node) may broadcast (e.g., or configure) the beam-specific measurement offset of one or more beams within the cell to encourage (e.g., or discourage) the service seeking node to select (e.g., or from selecting) the one or more beams of the cell.

A wireless node may broadcast beam-specific measurement offsets (e.g., via the q-OffsetCell IE in each synchronization signal block (SSB)) for a neighboring cell to assist cell reselection, for example for another wireless node (e.g., a UE operating in an idle mode). In some examples, beam-specific measurement offsets may be applied to one or more measurement values (e.g., RSRP, RSRQ, or SINR) associated for the corresponding neighboring cell. A wireless node (e.g., a UE operating in a connected mode for conditional handover) may be configured with cell-specific measurement offsets for handover event triggering. For example, a conditional handover event (e.g., a CondEvent A3) may be triggered if the UE operating in a connected mode for conditional handover (e.g., a served node) receives beam-specific measurement offsets and determines that the measurement value associated with a beam of a neighboring node satisfies a threshold (e.g., is greater than the corresponding value associated with a beam of the serving cell). That is, a conditional reconfiguration candidate may become the amount in which a measurement offset associated with a beam of a neighboring cell is greater than the ratio of a primary cell to a primary-secondary cell (e.g., PCell/PS-Cell).

In some examples, the beam-specific information may be signaled via the corresponding beam. For example, the beam-specific information reflecting the performance of the beam identified by (e.g., corresponding to) the first SSB transmitted by a wireless node (e.g., a serving node) may be transmitted by the same beam (e.g., the beam with a same beam identifier) or by a quasi co-located beam (e.g., a beam that is quasi co-located with the beam by which the first SSB was transmitted). In some case, the beam-specific information may be transmitted in a master information block (MIB), a remaining minimum system information (RMSI), or a discovery message in a physical downlink shared channel (PDSCH) or a physical sidelink shared channel (PSSCH) associated (e.g., quasi co-located) with the beam by which the first SSB was transmitted). In some other examples, the beam-specific information may be signaled via different beams. For example, the beam-specific information associated with different beams (e.g., different beams used to transmit different SSBs) may be transmitted in a MIB, a RMSI, or a discovery message in a PDSCH or a PSSCH associated (e.g., quasi co-located) with each transmitted SSB. In other words, the beam-specific information for each respective beam may be repeated in every SSB transmitted by the serving node.

In some examples, rather than providing beam-specific information (e.g., beam-specific KPIs or beam-specific measurement offsets) a wireless node (e.g., a serving node) may broadcast TRP-specific information. For example, the serving node may broadcast different KPIs or different measurement offsets for different TRPs operating within the cell. In some examples, the wireless node may also transmit information regarding which cell selection reference signals (e.g., which SSBs) are associated with which TRP and, accordingly, which beams correspond to which TRPs. In some examples, the association information may be signaled with the beam-specific information, and in some other examples, the association information may be signaled in different transmissions (e.g., separately).

Figure 4:
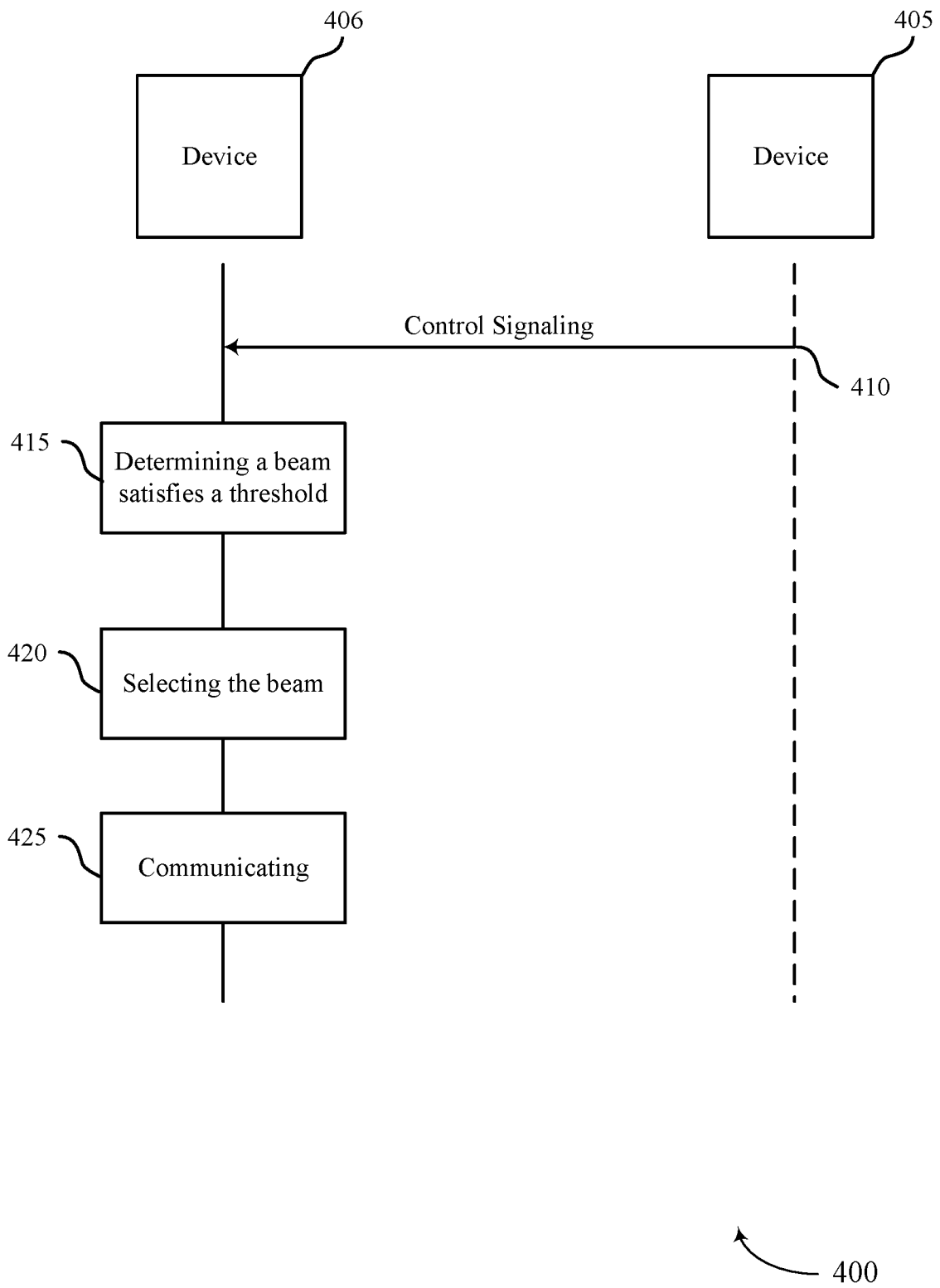
FIGS. 4 and 5 each illustrate an example of a process flow that supports beam-specific KPI indication for serving node selection in accordance with aspects of the present disclosure.

FIG. 4 illustrates an example of a process flow 400 that supports beam-specific KPI indication for serving node selection in accordance with aspects of the present disclosure. The process flow 400 may implement or be implemented by one or more aspects of the wireless communications system 100 and the wireless communications system 200. For example, the process flow 400 may include a device 405-*a* and a device 405-*b*, which may be examples of devices as discussed with reference to FIG. 1. In the example of FIG. 4, the device 406 may be a served node (e.g., a UE 115) and the device 405 may be serving node (e.g., a base station 105 a relay UE 115). In the following description of the process flow 400, operations between a device 406 and the device 405 may occur in a different order or at different times than as shown. Some operations may also be omitted from the process flow 400, and other operations may be added to the process flow 400.

At 410, the device 406 may receive, from the device 405, control signaling indicating beam information for each beam of a set of beams associated with a cell (e.g., a cell served by the device 405 or one or more cells served by neighboring nodes). In some examples, the beam information may include a set of beam metrics (e.g., beam-specific KPIs) associated with each beam of the set of beams associated with the cell. At 415, the device 406 may determine that at least one beam metric of the set of beam metrics associated with a beam satisfies a threshold (e.g., may provide suitable performance) and at 420 the device may select the beam for wireless communication with the cell. Then, at 425, the device 406 may communicate using the selected beam.

Figure 5:
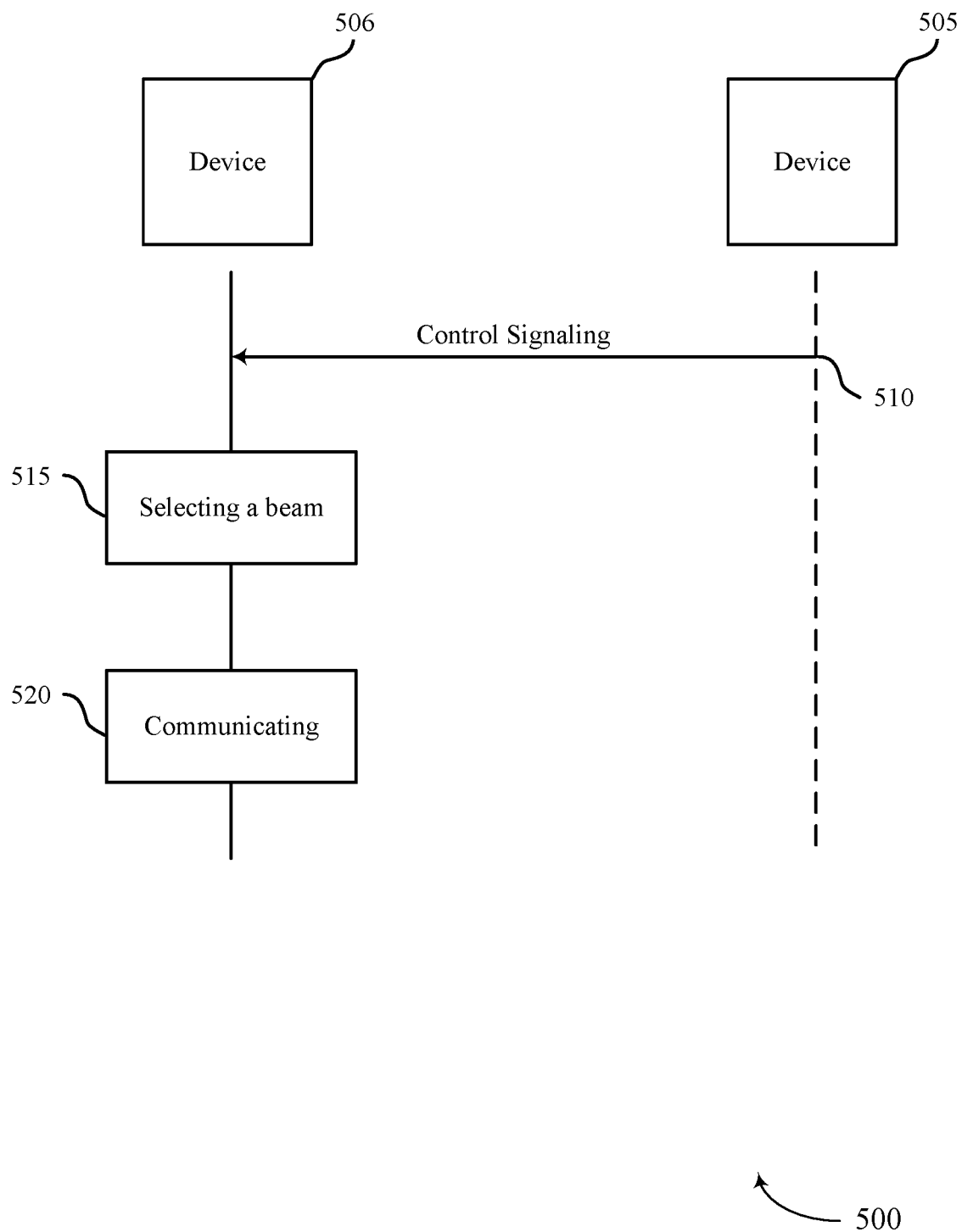

FIG. 5 illustrates an example of a process flow 500 that supports beam-specific KPI indication for serving node selection in accordance with aspects of the present disclosure. The process flow 500 may implement or be implemented by one or more aspects of the wireless communications system 100 and the wireless communications system 200. For example, the process flow 500 may include a device 505-*a* and a device 505-*b*, which may be examples of devices as discussed with reference to FIG. 1. In the example of FIG. 5, the device 506 may be a served node (e.g., a UE 115) and the device 505 may be serving node (e.g., a base station 105 a relay UE 115). In the following description of the process flow 500, operations between a device 506 and the device 505 may occur in a different order or at different times than as shown. Some operations may also be omitted from the process flow 500, and other operations may be added to the process flow 500.

At 510, the device 506 may receive, from the device 505, control signaling indicating beam information for each beam of a set of beams. In some examples, the beam information may include a respective beam measurement offset (e.g., a beam-specific measurement offset) associated with each beam of the set of beams. At 515, the device 506 may select a beam, of the set of beams, for the wireless communication based on the received control signaling and, at 520, the device 506 may communicate using the selected beam.

Figure 6:
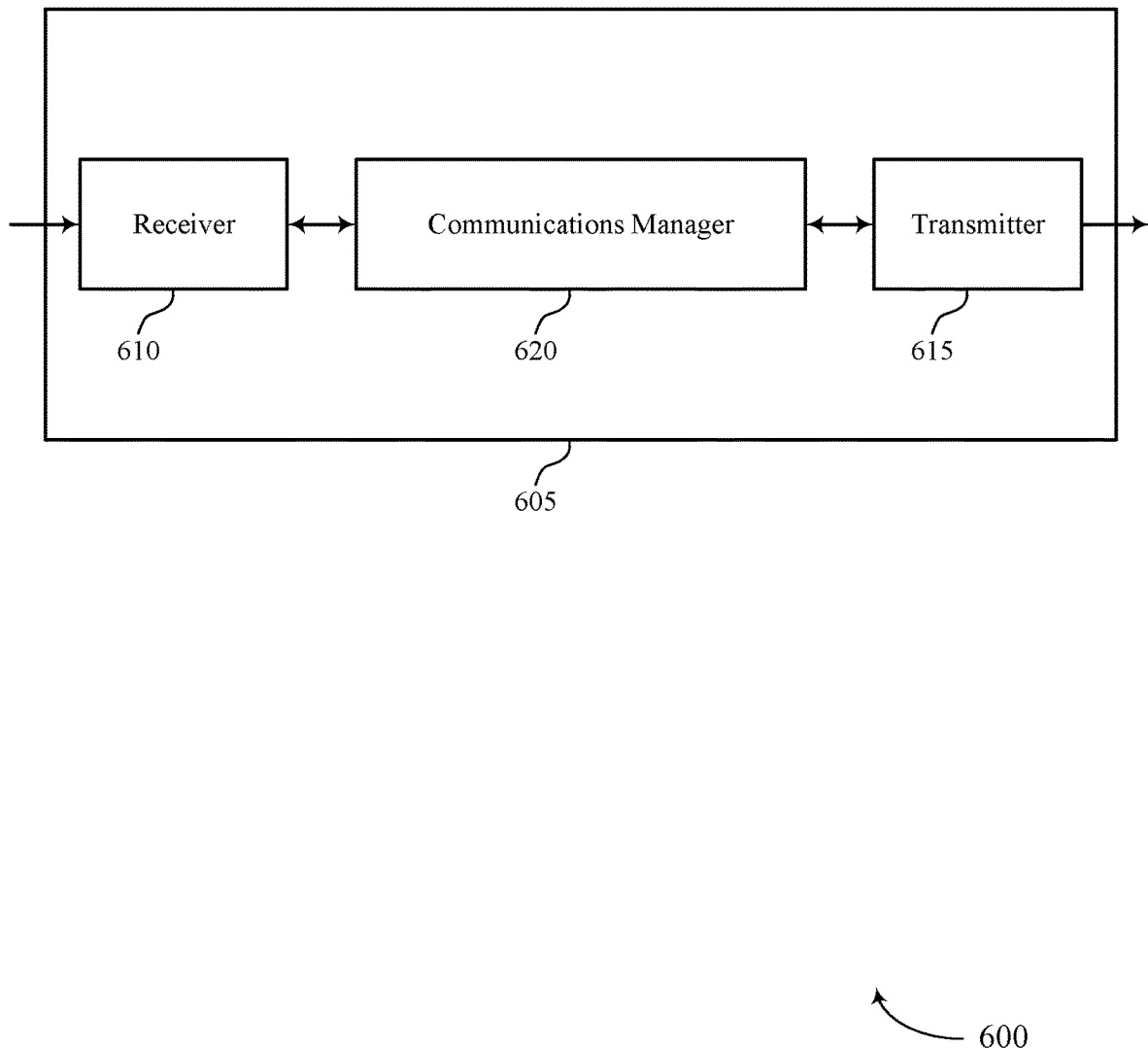
FIGS. 6 and 7 show block diagrams of devices that support beam-specific KPI indication for serving node selection in accordance with aspects of the present disclosure.

FIG. 6 shows a block diagram 600 of a device 605 that supports beam-specific KPI indication for serving node selection in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to beam-specific KPI indication for serving node selection). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to beam-specific KPI indication for serving node selection). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of beam-specific KPI indication for serving node selection as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first device (e.g., the device 605) in accordance with examples as disclosed herein. For example, the communications manager 620 may be configured as or otherwise support a means for receiving, from a second device (e.g., a base station 105 or a UE 115), control signaling indicating beam information for each beam of a set of beams associated with a cell, the beam information including a set of beam performance metrics associated with each beam of the set of beams associated with the cell. The communications manager 620 may be configured as or otherwise support a means for determining that at least one beam performance metric of the set of beam performance metrics associated with a beam satisfies a threshold. The communications manager 620 may be configured as or otherwise support a means for selecting the beam of the set of beams for the wireless communication with the cell based on the at least one beam performance metric satisfying the threshold. The communications manager 620 may be configured as or otherwise support a means for communicating using the selected beam of the set of beams.

Additionally or alternatively, the communications manager 620 may support wireless communication at the device 605 in accordance with examples as disclosed herein. For example, the communications manager 620 may be configured as or otherwise support a means for receiving, from a second device (e.g., a base station 105 or a UE 115), control signaling indicating beam information for each beam of a set of beams, the beam information including a respective beam measurement offset associated with each beam of the set of beams. The communications manager 620 may be configured as or otherwise support a means for selecting a beam of the set of beams of a cell for the wireless communication based on the received control signaling. The communications manager 620 may be configured as or otherwise support a means for communicating using the selected beam of the set of beams.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing and more efficient utilization of communication resources.

Figure 7:
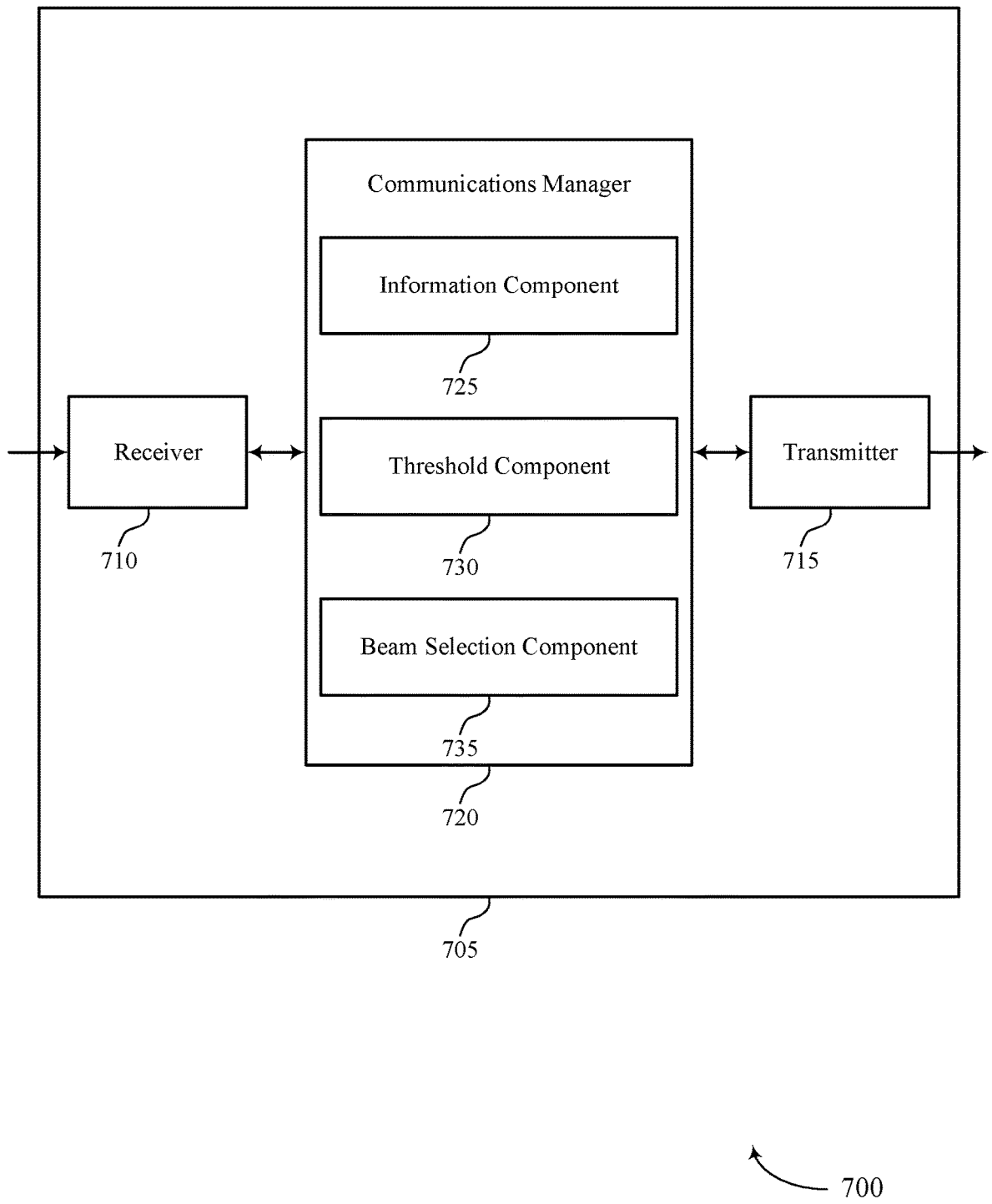

FIG. 7 shows a block diagram 700 of a device 705 that supports beam-specific KPI indication for serving node selection in accordance with aspects of the present disclosure. The device 705 may be an example of aspects of a device 605 or a device (e.g., a UE 115) as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to beam-specific KPI indication for serving node selection). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to beam-specific KPI indication for serving node selection). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of beam-specific KPI indication for serving node selection as described herein. For example, the communications manager 720 may include an information component 725, a threshold component 730, a beam selection component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first device (e.g., the device 705) in accordance with examples as disclosed herein. The information component 725 may be configured as or otherwise support a means for receiving, from a second device (e.g., a base station 105 or a UE 115), control signaling indicating beam information for each beam of a set of beams associated with a cell, the beam information including a set of beam performance metrics associated with each beam of the set of beams associated with the cell. The threshold component 730 may be configured as or otherwise support a means for determining that at least one beam performance metric of the set of beam performance metrics associated with a beam satisfies a threshold. The beam selection component 735 may be configured as or otherwise support a means for selecting the beam of the set of beams for the wireless communication with the cell based on the at least one beam performance metric satisfying the threshold. The beam selection component 735 may be configured as or otherwise support a means for communicating using the selected beam of the set of beams.

Additionally or alternatively, the communications manager 720 may support wireless communication at a first device in accordance with examples as disclosed herein. The information component 725 may be configured as or otherwise support a means for receiving, from a second device, control signaling indicating beam information for each beam of a set of beams, the beam information including a respective beam measurement offset associated with each beam of the set of beams. The beam selection component 735 may be configured as or otherwise support a means for selecting a beam of the set of beams of a cell for the wireless communication based on the received control signaling. The beam selection component 735 may be configured as or otherwise support a means for communicating using the selected beam of the set of beams.

Figure 8:
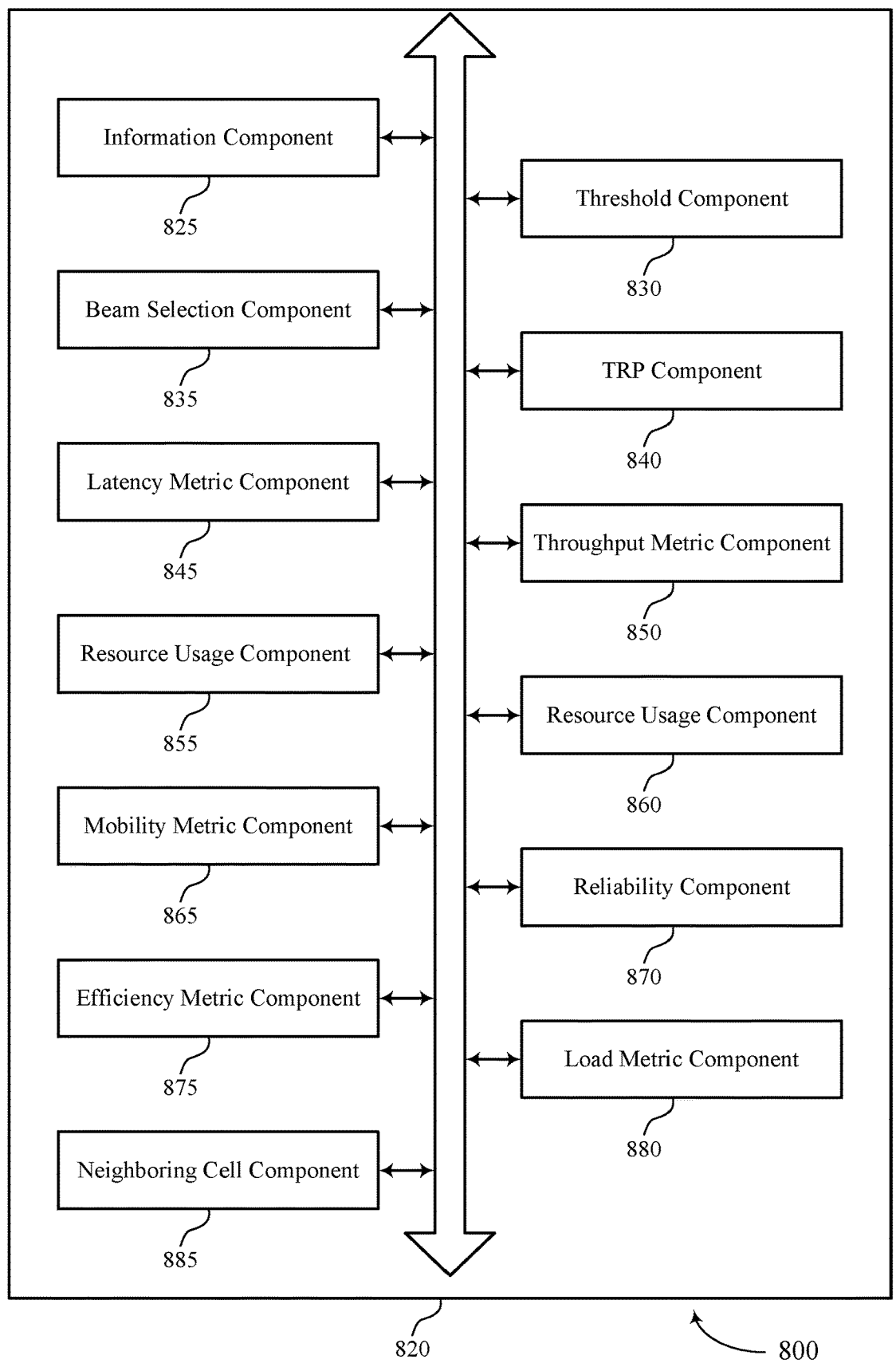
FIG. 8 shows a block diagram of a communications manager that supports beam-specific KPI indication for serving node selection in accordance with aspects of the present disclosure.

FIG. 8 shows a block diagram 800 of a communications manager 820 that supports beam-specific KPI indication for serving node selection in accordance with aspects of the present disclosure. The communications manager 820 may be an example of aspects of a communications manager 620, a communications manager 720, or both, as described herein. The communications manager 820, or various components thereof, may be an example of means for performing various aspects of beam-specific KPI indication for serving node selection as described herein. For example, the communications manager 820 may include an information component 825, a threshold component 830, a beam selection component 835, an TRP component 840, a latency metric component 845, a throughput metric component 850, a resource usage component 855, a resource usage component 860, a mobility metric component 865, a reliability component 870, an efficiency metric component 875, a load metric component 880, a neighboring cell component 885, or any combination thereof. Each of these components may communicate, directly or indirectly, with one another (e.g., via one or more buses).

The communications manager 820 may support wireless communication at a first device (e.g., a UE 115) in accordance with examples as disclosed herein. The information component 825 may be configured as or otherwise support a means for receiving, from a second device (e.g., a base station 105 or another UE 115), control signaling indicating beam information for each beam of a set of beams associated with a cell, the beam information including a set of beam performance metrics associated with each beam of the set of beams associated with the cell. The threshold component 830 may be configured as or otherwise support a means for determining that at least one beam performance metric of the set of beam performance metrics associated with a beam satisfies a threshold. The beam selection component 835 may be configured as or otherwise support a means for selecting the beam of the set of beams for the wireless communication with the cell based on the at least one beam performance metric satisfying the threshold. In some examples, the beam selection component 835 may be configured as or otherwise support a means for communicating using the selected beam of the set of beams.

In some examples, the TRP component 840 may be configured as or otherwise support a means for receiving, from the second device (e.g., a base station 105 or another UE 115), second control signaling indicating TRP information for each TRP of a set of TRPs, the TRP information including a set of TRP metrics associated with each TRP of the set of TRPs, at least one TRP metric of the set of TRP metrics satisfying the threshold, where selecting the beam of the set of beams for the wireless communication is based on the received second control signaling. In some examples, the TRP component 840 may be configured as or otherwise support a means for receiving, from the second device (e.g., the base station 105 or the other UE 115), third control signaling indicating an association between each beam of the set of beams and each TRP of the set of TRPs.

In some examples, the latency metric component 845 may be configured as or otherwise support a means for determining a latency metric for each beam of the set of beams based on the set of beam performance metrics associated with each beam of the set of beams. In some examples, the latency metric component 845 may be configured as or otherwise support a means for selecting the beam of the set of beams for the wireless communication based on determining the latency metric for each beam of the set of beams. In some examples, the latency metric includes a delay for one or both of a downlink or an uplink between the first device (e.g., the UE 115) and the second device (e.g., the base station 105 or the other UE 115).

In some examples, the throughput metric component 850 may be configured as or otherwise support a means for determining a throughput metric for each beam of the set of beams based on the set of beam performance metrics associated with each beam of the set of beams. In some examples, the throughput metric component 850 may be configured as or otherwise support a means for selecting the beam of the set of beams for the wireless communication based on determining the throughput metric for each beam of the set of beams. In some examples, the throughput metric includes a throughput for one or both of a downlink or an uplink between the first device (e.g., the UE 115) and the second device (e.g., the base station 105 or the other UE 115).

In some examples, the resource usage component 855 may be configured as or otherwise support a means for determining a resource usage for each beam of the set of beams based on the set of beam performance metrics associated with each beam of the set of beams. In some examples, the resource usage component 860 may be configured as or otherwise support a means for selecting the beam of the set of beams for the wireless communication based on determining the resource usage for each beam of the set of beams. In some examples, the resource usage includes one or more of a number of protocol data unit sessions, an average number of protocol data unit sessions, a protocol data unit establishment time, or an average number of successful registration updates.

In some examples, the mobility metric component 865 may be configured as or otherwise support a means for determining a mobility metric for each beam of the set of beams based on the set of beam performance metrics associated with each beam of the set of beams. In some examples, the mobility metric component 865 may be configured as or otherwise support a means for selecting the beam of the set of beams for the wireless communication based on determining the mobility metric for each beam of the set of beams. In some examples, the mobility metric includes one or more of a handover success rate, an average time of handover, or a rate of mobility registration updates.

In some examples, the reliability component 870 may be configured as or otherwise support a means for determining a higher layer reliability metric for each beam of the set of beams based on the set of beam performance metrics associated with each beam of the set of beams. In some examples, the reliability component 870 may be configured as or otherwise support a means for selecting the beam of the set of beams for the wireless communication based on determining the higher layer reliability metric for each beam of the set of beams. In some examples, the higher layer reliability metric includes one or both of a quality-of-service reliability or a data radio bearer reliability.

In some examples, the efficiency metric component 875 may be configured as or otherwise support a means for determining an energy efficiency metric for each beam of the set of beams based on the set of beam performance metrics associated with each beam of the set of beams. In some examples, the efficiency metric component 875 may be configured as or otherwise support a means for selecting the beam of the set of beams for the wireless communication based on determining the energy efficiency metric for each beam of the set of beams.

In some examples, the reliability component 870 may be configured as or otherwise support a means for determining a physical layer reliability metric for each beam of the set of beams based on the set of beam performance metrics associated with each beam of the set of beams. In some examples, the reliability component 870 may be configured as or otherwise support a means for selecting the beam of the set of beams for the wireless communication based on determining the physical layer reliability metric for each beam of the set of beams. In some examples, the physical layer reliability metric includes an average number of transmission.

In some examples, the load metric component 880 may be configured as or otherwise support a means for determining an over-the-air load metric for each beam of the set of beams based on the set of beam performance metrics associated with each beam of the set of beams. In some examples, the load metric component 880 may be configured as or otherwise support a means for selecting the beam of the set of beams for the wireless communication based on determining the over-the-air load metric for each beam of the set of beams. In some examples, the over-the-air load metric includes one or both of a number of devices served by the respective beam or a ratio of utilized time resources to utilized frequency resources. In some examples, the control signaling indicates beam information for the respective beam used to transmit the control signaling, a beam different from the respective beam, or both. In some examples, the control signaling includes a broadcast control signal received at the first device.

Additionally or alternatively, the communications manager 820 may support wireless communication at a first device (e.g., a UE 115) in accordance with examples as disclosed herein. In some examples, the information component 825 may be configured as or otherwise support a means for receiving, from a second device (e.g., a base station 105 or another UE 115), control signaling indicating beam information for each beam of a set of beams, the beam information including a respective beam measurement offset associated with each beam of the set of beams. In some examples, the beam selection component 835 may be configured as or otherwise support a means for selecting a beam of the set of beams of a cell for the wireless communication based on the received control signaling. In some examples, the beam selection component 835 may be configured as or otherwise support a means for communicating using the selected beam of the set of beams.

In some examples, the TRP component 840 may be configured as or otherwise support a means for receiving, from the second device (e.g., the base station 105 or the other UE 115), second control signaling indicating TRP information for each TRP of a set of TRPs, the TRP information including a respective TRP measurement offset associated with each TRP of the set of TRPs. In some examples, the TRP component 840 may be configured as or otherwise support a means for selecting the beam of the set of beams for the wireless communication based on the received second control signaling.

In some examples, the TRP component 840 may be configured as or otherwise support a means for receiving, from the second device (e.g., the base station 105 or the UE 115), third control signaling indicating an association between each beam of the set of beams and each TRP of the set of TRPs. In some examples, the TRP component 840 may be configured as or otherwise support a means for communicating the wireless communication based on the received third control signaling.

In some examples, the neighboring cell component 885 may be configured as or otherwise support a means for determining, based on the beam information, that one or more beams of the set of beams are associated with a neighboring cell, the neighboring cell includes the cell. In some examples, the neighboring cell component 885 may be configured as or otherwise support a means for selecting the beam of the set of beams for the wireless communication based on determining that a measurement value associated with a respective beam of the one or more beams associated with the neighboring cell satisfies a criterion, the measurement value is based on a beam measurement offset associated with the respective beam of the neighboring cell.

In some examples, the neighboring cell component 885 may be configured as or otherwise support a means for establishing a connection with the neighboring cell based on determining that the measurement value associated with the respective beam of the one or more beams associated with the neighboring cell satisfies the criterion. In some examples, the neighboring cell component 885 may be configured as or otherwise support a means for communicating the wireless communication based on the established connection with the neighboring cell. In some examples, the measurement value includes at least one of a reference signal received power value, a reference signal received quality value, or a signal to interference plus noise ratio value. In some examples, the control signaling includes a system information block.

In some examples, to support selecting the beam of the set of beams for the wireless communication, the beam selection component 835 may be configured as or otherwise support a means for selecting a beam associated with a neighboring cell based on the beam information triggering a handover procedure and determining that a beam measurement offset corresponding to the beam associated with the neighboring cell satisfies a threshold, the neighboring cell including the cell. In some examples, the neighboring cell component 885 may be configured as or otherwise support a means for performing the handover procedure based on the selected beam being associated with the neighboring cell. In some examples, the neighboring cell component 885 may be configured as or otherwise support a means for communicating the wireless communication based on performing the handover procedure.

Figure 9:
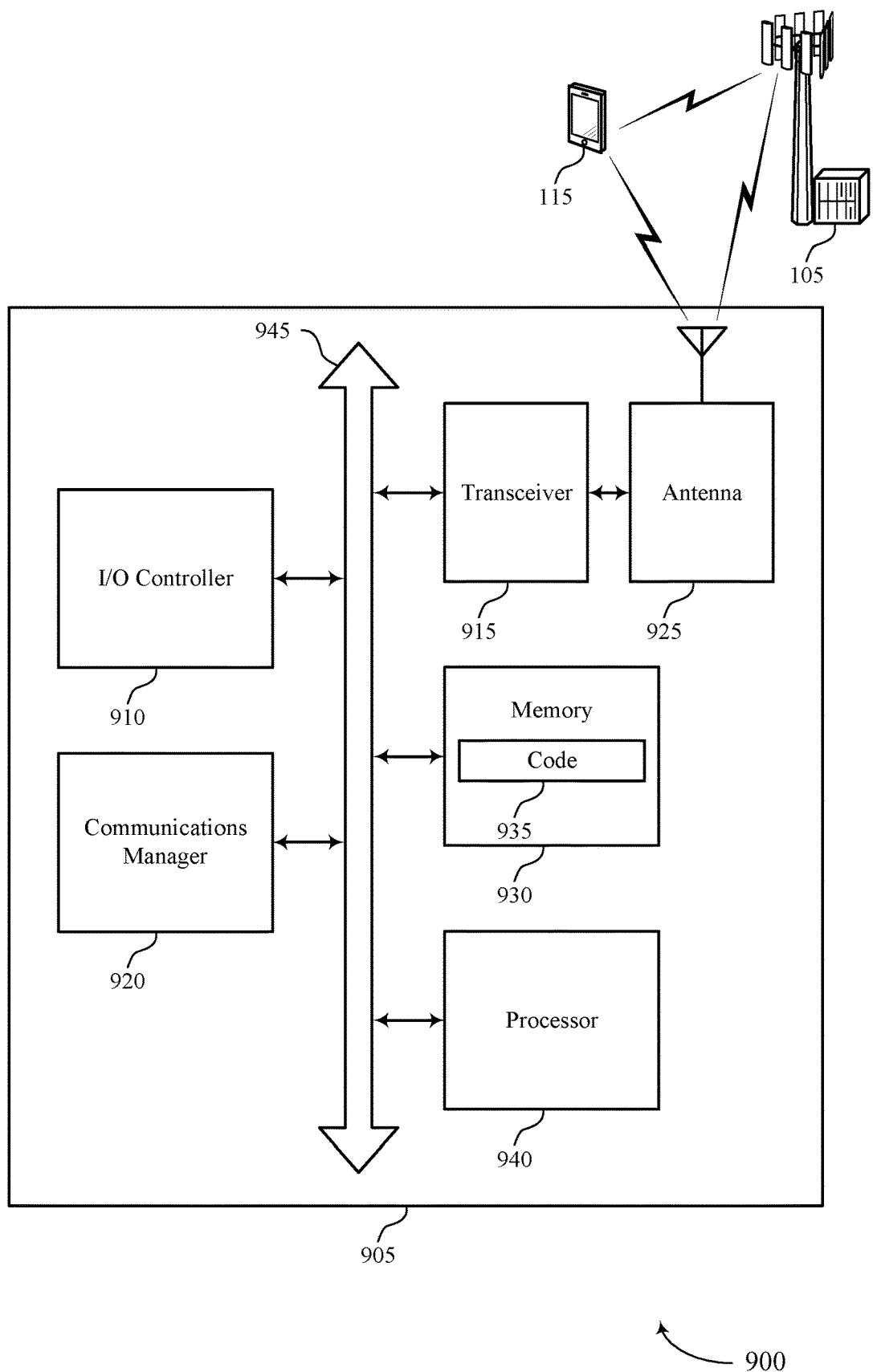
FIG. 9 shows a diagram of a system including a device that supports beam-specific KPI indication for serving node selection in accordance with aspects of the present disclosure.

FIG. 9 shows a diagram of a system 900 including a device 905 that supports beam-specific KPI indication for serving node selection in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting beam-specific KPI indication for serving node selection). For example, the device 905 or a component of the device 905 may include a processor 940 and memory 930 coupled to the processor 940, the processor 940 and memory 930 configured to perform various functions described herein.

The communications manager 920 may support wireless communication at a first device (e.g., the device 905) in accordance with examples as disclosed herein. For example, the communications manager 920 may be configured as or otherwise support a means for receiving, from a second device (e.g., a base station 105 or a UE 115), control signaling indicating beam information for each beam of a set of beams associated with a cell, the beam information including a set of beam performance metrics associated with each beam of the set of beams associated with the cell. The communications manager 920 may be configured as or otherwise support a means for determining that at least one beam performance metric of the set of beam performance metrics associated with a beam satisfies a threshold. The communications manager 920 may be configured as or otherwise support a means for selecting the beam of the set of beams for the wireless communication with the cell based on the at least one beam performance metric satisfying the threshold. The communications manager 920 may be configured as or otherwise support a means for communicating using the selected beam of the set of beams.

Additionally or alternatively, the communications manager 920 may support wireless communication at a first device (e.g., the device 905) in accordance with examples as disclosed herein. For example, the communications manager 920 may be configured as or otherwise support a means for receiving, from a second device (e.g., a base station 105 or a UE 115), control signaling indicating beam information for each beam of a set of beams, the beam information including a respective beam measurement offset associated with each beam of the set of beams. The communications manager 920 may be configured as or otherwise support a means for selecting a beam of the set of beams of a cell for the wireless communication based on the received control signaling. The communications manager 920 may be configured as or otherwise support a means for communicating using the selected beam of the set of beams.

By including or configuring the communications manager 920 in accordance with examples as described herein, the device 905 may support techniques for improved communication reliability, reduced latency, improved user experience related to reduced processing, more efficient utilization of communication resources, improved coordination between devices, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of beam-specific KPI indication for serving node selection as described herein, or the processor 940 and the memory 930 may be otherwise configured to perform or support such operations.

Figure 10:
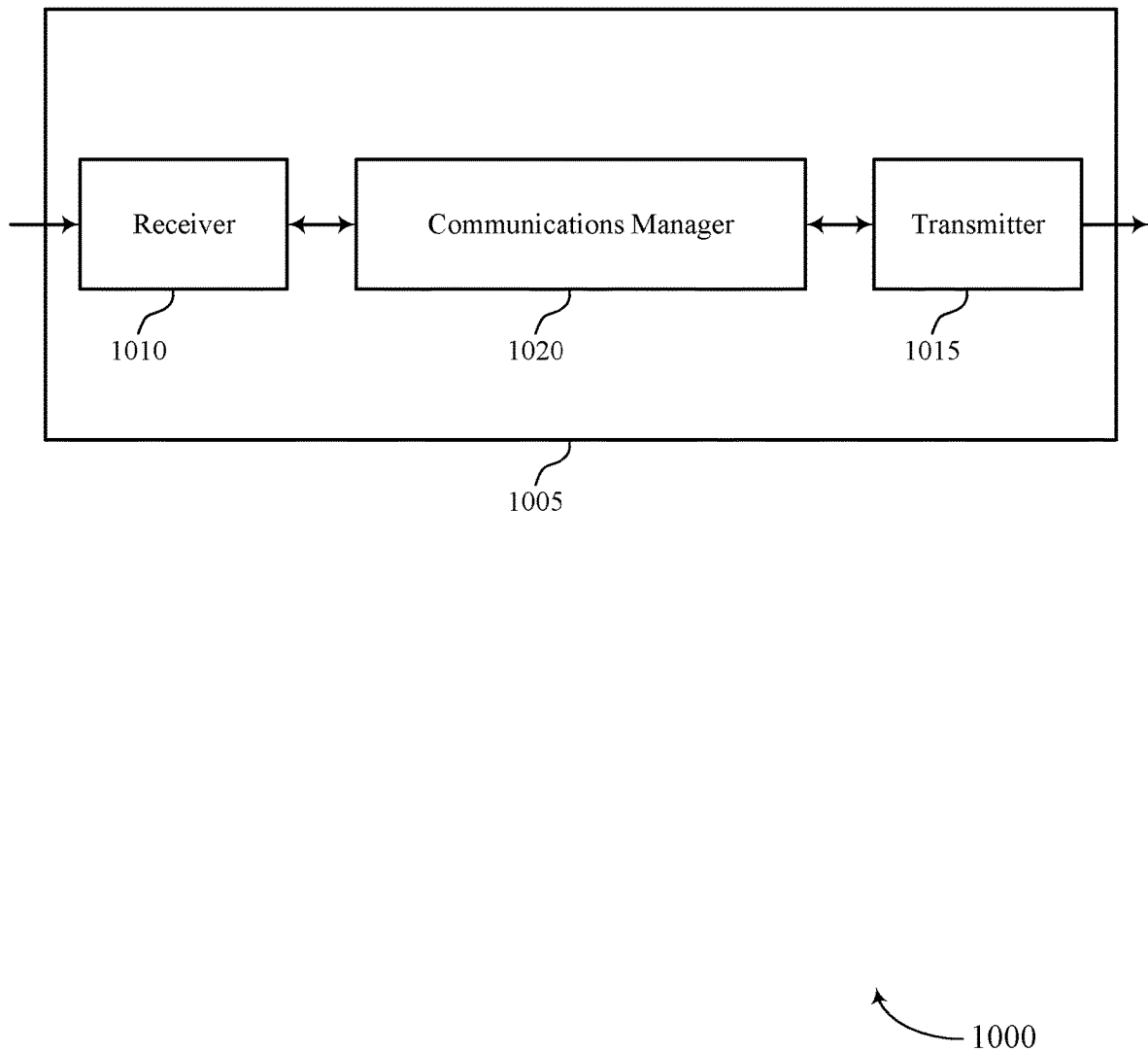
FIGS. 10 and 11 show block diagrams of devices that support beam-specific KPI indication for serving node selection in accordance with aspects of the present disclosure.

FIG. 10 shows a block diagram 1000 of a device 1005 that supports beam-specific KPI indication for serving node selection in accordance with aspects of the present disclosure. The device 1005 may be an example of aspects of a base station 105 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to beam-specific KPI indication for serving node selection). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to beam-specific KPI indication for serving node selection). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of beam-specific KPI indication for serving node selection as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a second device (e.g., the device 1005) in accordance with examples as disclosed herein. For example, the communications manager 1020 may be configured as or otherwise support a means for transmitting, to a first device (e.g., a UE 115), control signaling indicating beam information for each beam of a set of beams associated with a cell, the beam information including a set of beam performance metrics associated with each beam of the set of beams associated with the cell, where at least one beam performance metric of the set of beam performance metrics associated with a beam satisfies a threshold.

Additionally or alternatively, the communications manager 1020 may support wireless communication at a second device (e.g., the device 1005) in accordance with examples as disclosed herein. For example, the communications manager 1020 may be configured as or otherwise support a means for transmitting, to a first device (e.g., a UE 115), control signaling indicating beam information for each beam of a set of beams, the beam information including a respective beam measurement offset associated with each beam of the set of beams.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduced processing and more efficient utilization of communication resources.

Figure 11:
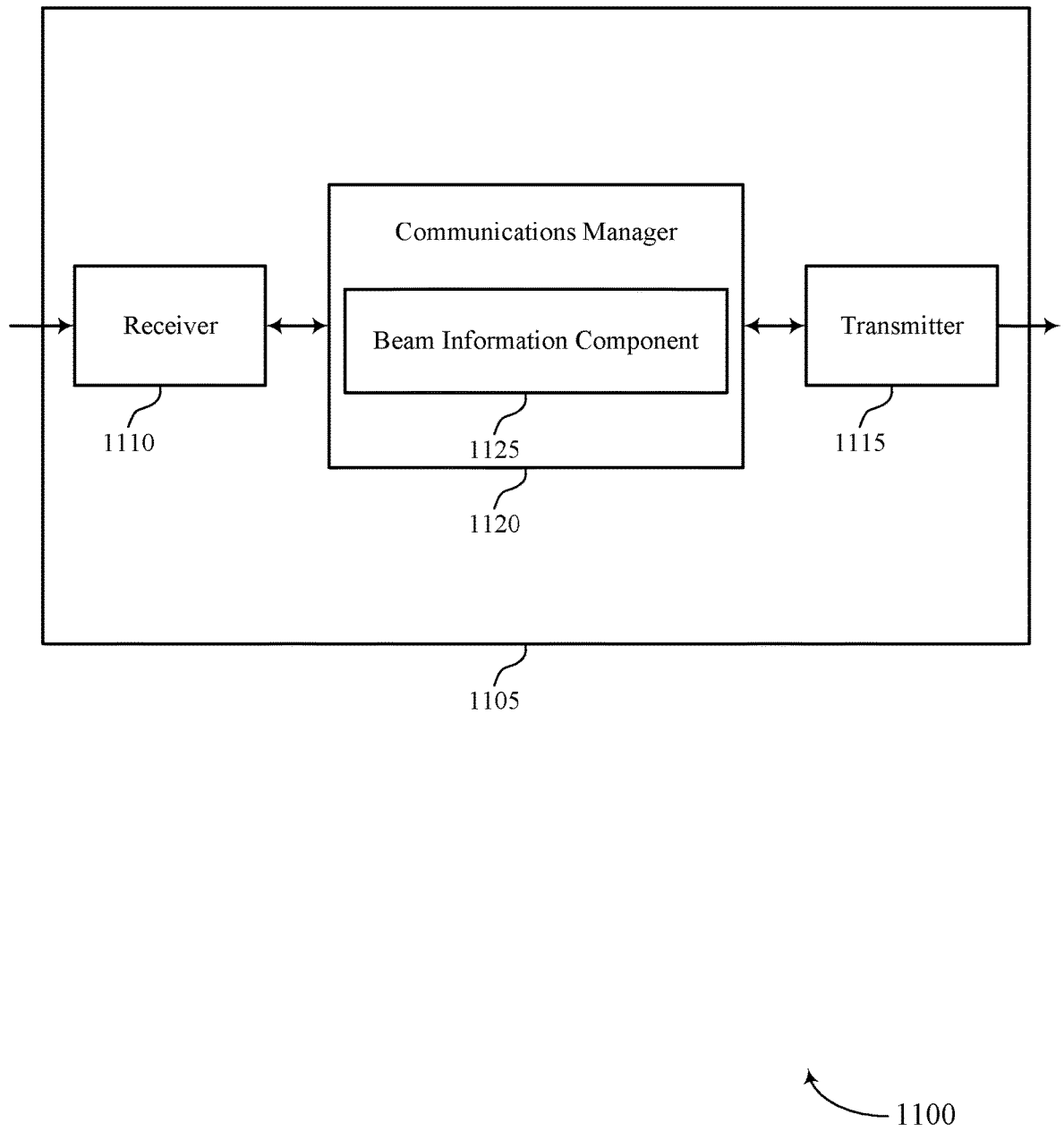

FIG. 11 shows a block diagram 1100 of a device 1105 that supports beam-specific KPI indication for serving node selection in accordance with aspects of the present disclosure. The device 1105 may be an example of aspects of a device 1005, a base station 105, or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to beam-specific KPI indication for serving node selection). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to beam-specific KPI indication for serving node selection). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of beam-specific KPI indication for serving node selection as described herein. For example, the communications manager 1120 may include a beam information component 1125, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a second device (e.g., the device 1105) in accordance with examples as disclosed herein. The beam information component 1125 may be configured as or otherwise support a means for transmitting, to a first device (e.g., a UE 115), control signaling indicating beam information for each beam of a set of beams associated with a cell, the beam information including a set of beam performance metrics associated with each beam of the set of beams associated with the cell, where at least one beam performance metric of the set of beam performance metrics associated with a beam satisfies a threshold.

Additionally or alternatively, the communications manager 1120 may support wireless communication at a second device (e.g., the device 1105) in accordance with examples as disclosed herein. The beam information component 1125 may be configured as or otherwise support a means for transmitting, to a first device (e.g., a UE 115), control signaling indicating beam information for each beam of a set of beams, the beam information including a respective beam measurement offset associated with each beam of the set of beams.

Figure 12:
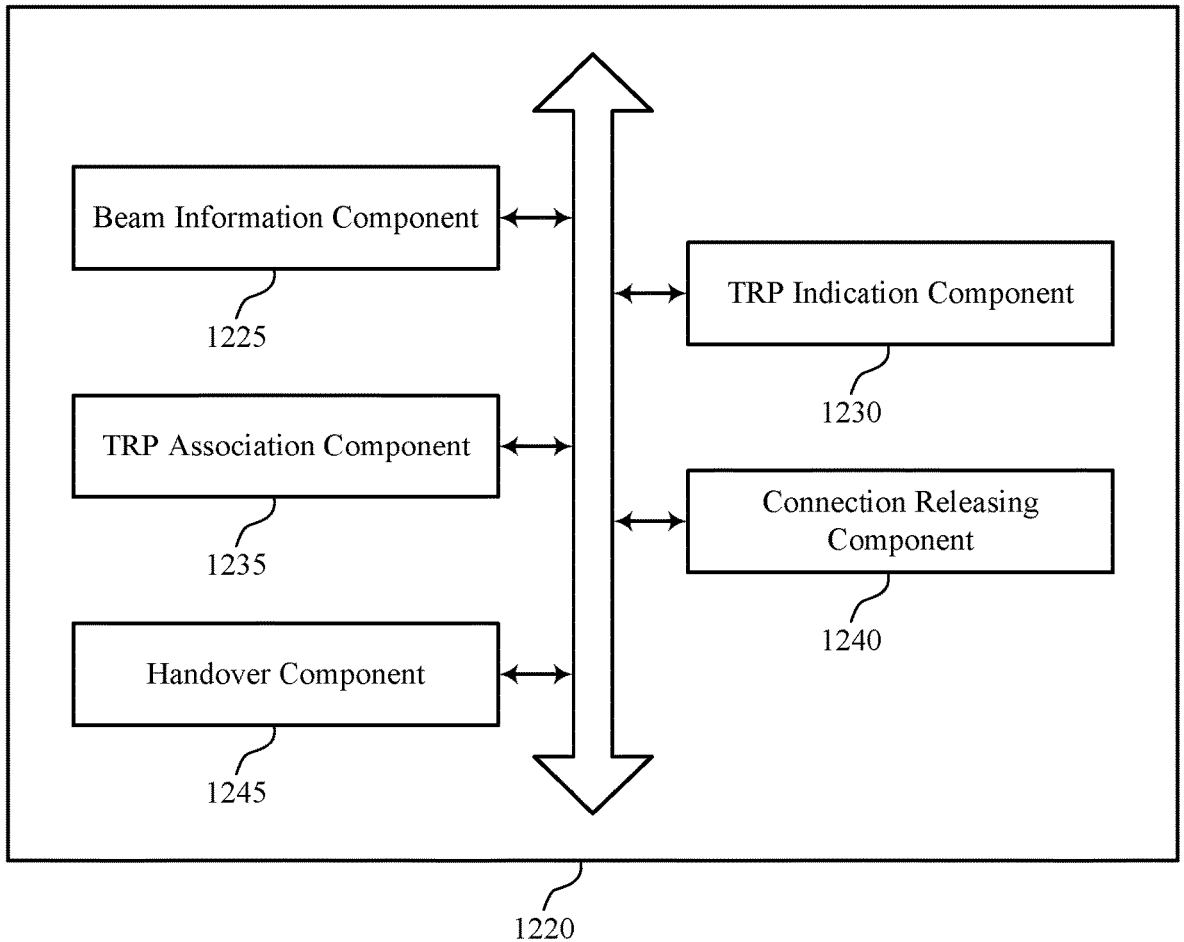
FIG. 12 shows a block diagram of a communications manager that supports beam-specific KPI indication for serving node selection in accordance with aspects of the present disclosure.

FIG. 12 shows a block diagram 1200 of a communications manager 1220 that supports beam-specific KPI indication for serving node selection in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of beam-specific KPI indication for serving node selection as described herein. For example, the communications manager 1220 may include a beam information component 1225, an TRP indication component 1230, an TRP association component 1235, a connection releasing component 1240, a handover component 1245, or any combination thereof. Each of these components may communicate, directly or indirectly, with one another (e.g., via one or more buses).

The communications manager 1220 may support wireless communication at a second device (e.g., a base station 105 or a UE 115) in accordance with examples as disclosed herein. The beam information component 1225 may be configured as or otherwise support a means for transmitting, to a first device (e.g., another UE 115), control signaling indicating beam information for each beam of a set of beams associated with a cell, the beam information including a set of beam performance metrics associated with each beam of the set of beams associated with the cell, where at least one beam performance metric of the set of beam performance metrics associated with a beam satisfies a threshold.

In some examples, the TRP indication component 1230 may be configured as or otherwise support a means for transmitting, to the first device (e.g., the other UE 115), second control signaling indicating TRP information for each TRP of a set of TRPs, the TRP information including a set of TRP metrics associated with each TRP of the set of TRPs, at least one TRP metric of the set of TRP metrics satisfying the threshold.

In some examples, the TRP association component 1235 may be configured as or otherwise support a means for transmitting, to the first device, third control signaling indicating an association between each beam of the set of beams and each TRP of the set of TRPs. In some examples, each beam of the set of beams is associated with a latency metric for the respective beam. In some examples, the latency metric includes a delay for one or both of a downlink or an uplink between the first device (e.g., the base station 105 or the UE 115) and the second device (e.g., the other UE 115).

In some examples, each beam of the set of beams is associated with a throughput metric for the respective beam. In some examples, the throughput metric includes a throughput for one or both of a downlink or an uplink between the first device (e.g., the base station 105 or the UE 115) and the second device (e.g., the other UE 115). In some examples, each beam of the set of beams is associated with a resource usage for the respective beam. In some examples, the resource usage includes one or more of a number of protocol data unit sessions, an average number of protocol data unit sessions, a protocol data unit establishment time, or an average number of successful registration updates.

In some examples, each beam of the set of beams is associated with a mobility metric for the respective beam. In some examples, the mobility metric includes one or more of a handover success rate, an average time of handover, or a rate of mobility registration updates. In some examples, each beam of the set of beams is associated with a higher layer reliability metric for the respective beam. In some examples, the higher layer reliability metric includes one or both of a quality-of-service reliability or a data radio bearer reliability.

In some examples, each beam of the set of beams is associated with an energy efficiency metric for the respective beam. In some examples, each beam of the set of beams is associated with a physical layer reliability metric for the respective beam. In some examples, the physical layer reliability metric includes an average number of transmission. In some examples, each beam of the set of beams is associated with an over-the-air load metric for the respective beam. In some examples, the over-the-air load metric includes one or both of a number of devices served by the respective beam or a ratio of utilized time resources to utilized frequency resources. In some examples, the control signaling indicates beam information for the respective beam used to transmit the control signaling, a beam different from the respective beam, or both. In some examples, the control signaling includes a broadcast signal broadcasted to the first device by the second device.

Additionally or alternatively, the communications manager 1220 may support wireless communication at a second device (e.g., a base station 105 or a UE 115) in accordance with examples as disclosed herein. In some examples, the beam information component 1225 may be configured as or otherwise support a means for transmitting, to a first device (e.g., another UE 115), control signaling indicating beam information for each beam of a set of beams, the beam information including a respective beam measurement offset associated with each beam of the set of beams.

In some examples, the TRP indication component 1230 may be configured as or otherwise support a means for transmitting, to the first device (e.g., the other UE 115), second control signaling indicating TRP information for each TRP of a set of TRPs, the TRP information including a respective TRP measurement offset associated with each TRP of the set of TRPs.

In some examples, the TRP association component 1235 may be configured as or otherwise support a means for transmitting, to the first device (the other UE 115), third control signaling indicating an association between each beam of the set of beams and each TRP of the set of TRPs.

In some examples, one or more beams of the set of beams are associated with a neighboring cell. In some examples, a measurement value associated with a respective beam of the one or more beams associated with the neighboring cell satisfies a criterion, the measurement value is based on a beam measurement offset associated with the respective beam of the neighboring cell. In some examples, the connection releasing component 1240 may be configured as or otherwise support a means for releasing a connection with the first device based on the measurement value associated with the respective beam of the one or more beams associated with the neighboring cell satisfying the criterion. In some examples, the measurement value includes at least one of a reference signal received power value, a reference signal received quality value, or a signal to interference plus noise ratio value.

In some examples, the handover component 1245 may be configured as or otherwise support a means for performing a handover procedure based on the measurement value associated with the respective beam of the one or more beams associated with the neighboring cell satisfying the criterion. In some examples, the control signaling includes a system information block.

Figure 13:
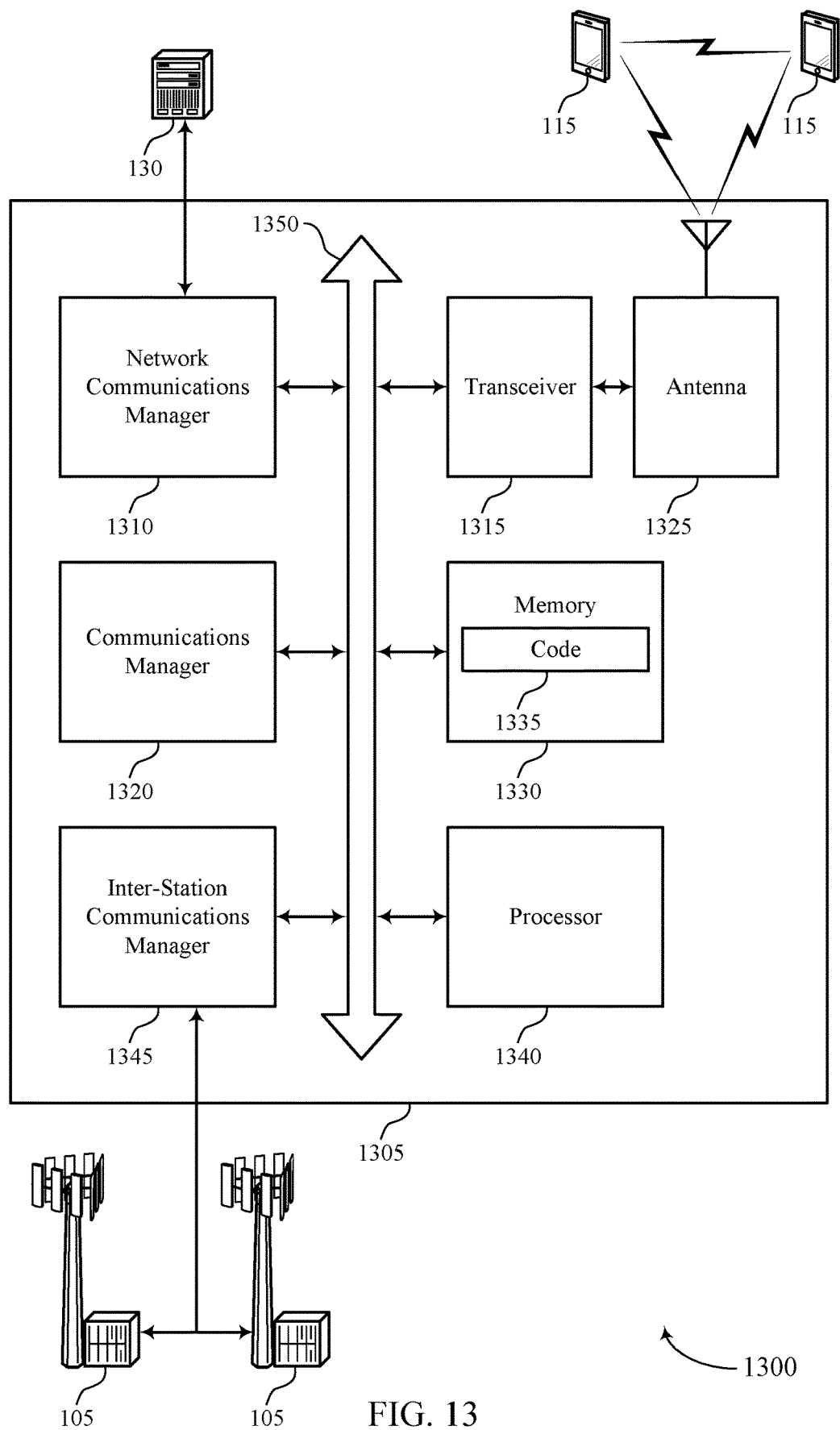
FIG. 13 shows a diagram of a system including a device that supports beam-specific KPI indication for serving node selection in accordance with aspects of the present disclosure.

FIG. 13 shows a diagram of a system 1300 including a device 1305 that supports beam-specific KPI indication for serving node selection in accordance with aspects of the present disclosure. The device 1305 may be an example of or include the components of a device 1005, a device 1105, a base station 105, or a UE 115 as described herein. The device 1305 may communicate wirelessly with one or more other base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting beam-specific KPI indication for serving node selection). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a second device (e.g., the device 1305) in accordance with examples as disclosed herein. For example, the communications manager 1320 may be configured as or otherwise support a means for transmitting, to a first device (e.g., a UE 115), control signaling indicating beam information for each beam of a set of beams associated with a cell, the beam information including a set of beam performance metrics associated with each beam of the set of beams associated with the cell, where at least one beam performance metric of the set of beam performance metrics associated with a beam satisfies a threshold.

Additionally or alternatively, the communications manager 1320 may support wireless communication at a second device (e.g., the device 1305) in accordance with examples as disclosed herein. For example, the communications manager 1320 may be configured as or otherwise support a means for transmitting, to a first device (e.g., a UE 115), control signaling indicating beam information for each beam of a set of beams, the beam information including a respective beam measurement offset associated with each beam of the set of beams.

By including or configuring the communications manager 1320 in accordance with examples as described herein, the device 1305 may support techniques for improved communication reliability, reduced latency, improved user experience related to reduced processing, more efficient utilization of communication resources, improved coordination between devices, and improved utilization of processing capability.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of beam-specific KPI indication for serving node selection as described herein, or the processor 1340 and the memory 1330 may be otherwise configured to perform or support such operations.

Figure 14:
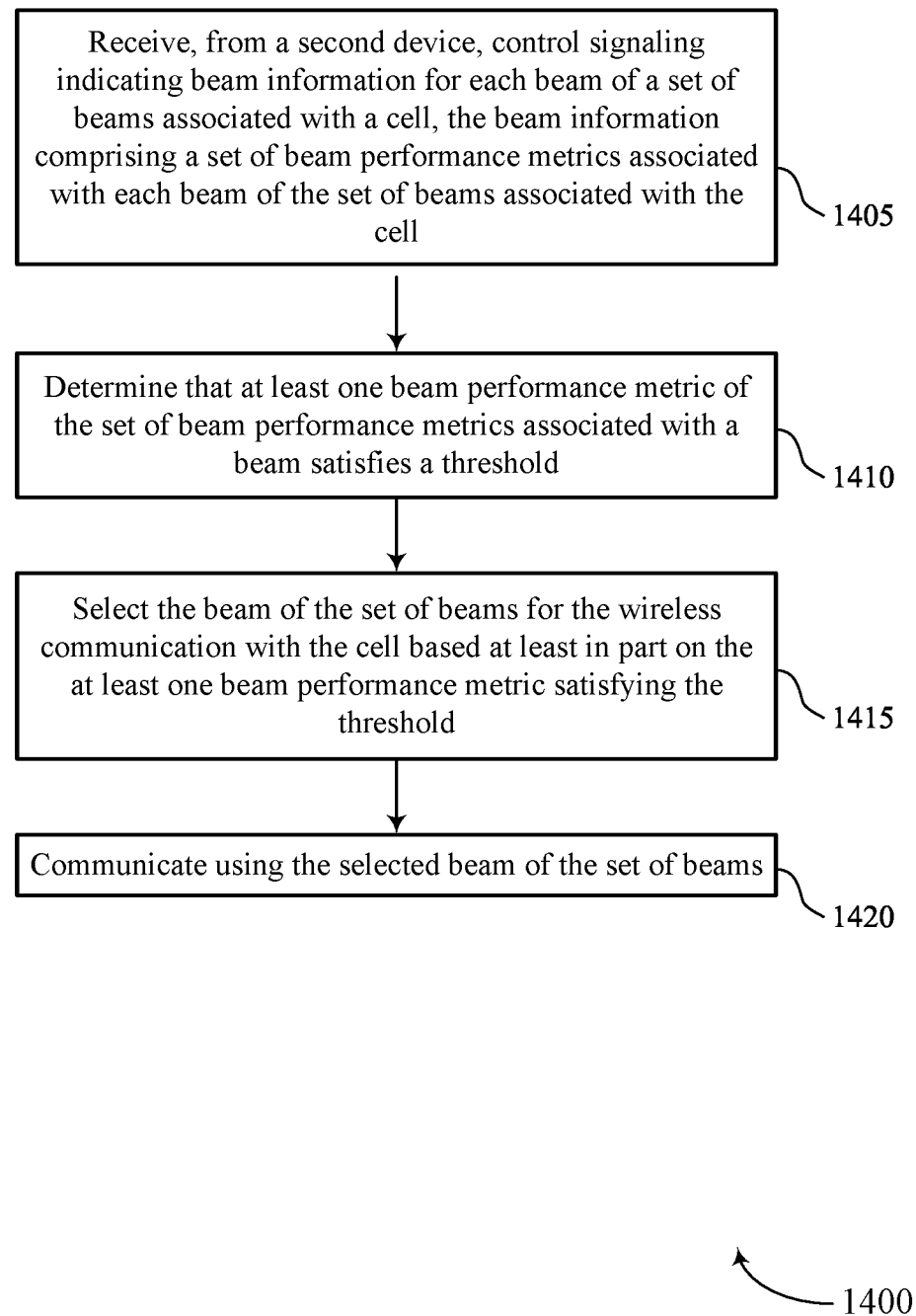
FIGS. 14 through 16 show flowcharts illustrating methods that support beam-specific KPI indication for serving node selection in accordance with aspects of the present disclosure.

FIG. 14 shows a flowchart illustrating a method 1400 that supports beam-specific KPI indication for serving node selection in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a second device (e.g., a base station 105 or another UE 115), control signaling indicating beam information for each beam of a set of beams associated with a cell, the beam information including a set of beam performance metrics associated with each beam of the set of beams associated with the cell. The operations of 1405 may be performed in accordance with examples as disclosed herein. In some examples, aspects of the operations of 1405 may be performed by an information component 825 as described with reference to FIG. 8.

At 1410, the method may include determining that at least one beam performance metric of the set of beam performance metrics associated with a beam satisfies a threshold. The operations of 1410 may be performed in accordance with examples as disclosed herein. In some examples, aspects of the operations of 1410 may be performed by a threshold component 830 as described with reference to FIG. 8.

At 1415, the method may include selecting the beam of the set of beams for the wireless communication with the cell based on the at least one beam performance metric satisfying the threshold. The operations of 1415 may be performed in accordance with examples as disclosed herein. In some examples, aspects of the operations of 1415 may be performed by a beam selection component 835 as described with reference to FIG. 8.

At 1420, the method may include communicating using the selected beam of the set of beams. The operations of 1420 may be performed in accordance with examples as disclosed herein. In some examples, aspects of the operations of 1420 may be performed by a beam selection component 835 as described with reference to FIG. 8.

Figure 15:
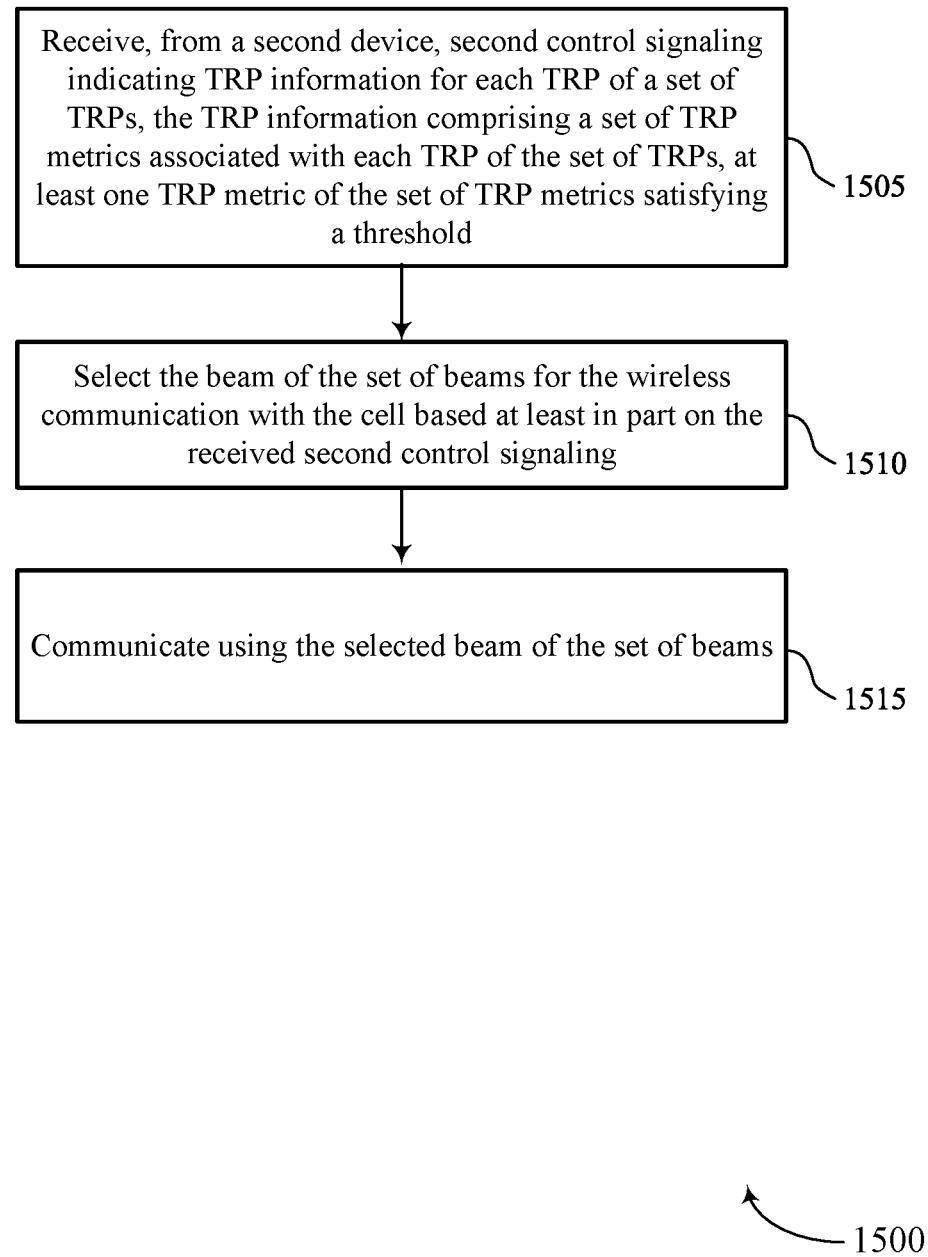

FIG. 15 shows a flowchart illustrating a method 1500 that supports beam-specific KPI indication for serving node selection in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a second device (e.g., the base station 105 or the other UE 115), second control signaling indicating TRP information for each TRP of a set of TRPs, the TRP information including a set of TRP metrics associated with each TRP of the set of TRPs, at least one TRP metric of the set of TRP metrics satisfying a threshold. The operations of 1505 may be performed in accordance with examples as disclosed herein. In some examples, aspects of the operations of 1505 may be performed by an TRP component 840 as described with reference to FIG. 8.

At 1510, the method may include selecting the beam of the set of beams for the wireless communication with the cell based on the received second control signaling. The operations of 1510 may be performed in accordance with examples as disclosed herein. In some examples, aspects of the operations of 1510 may be performed by a beam selection component 835 as described with reference to FIG. 8.

At 1515, the method may include communicating using the selected beam of the set of beams. The operations of 1515 may be performed in accordance with examples as disclosed herein. In some examples, aspects of the operations of 1515 may be performed by a beam selection component 835 as described with reference to FIG. 8.

Figure 16:
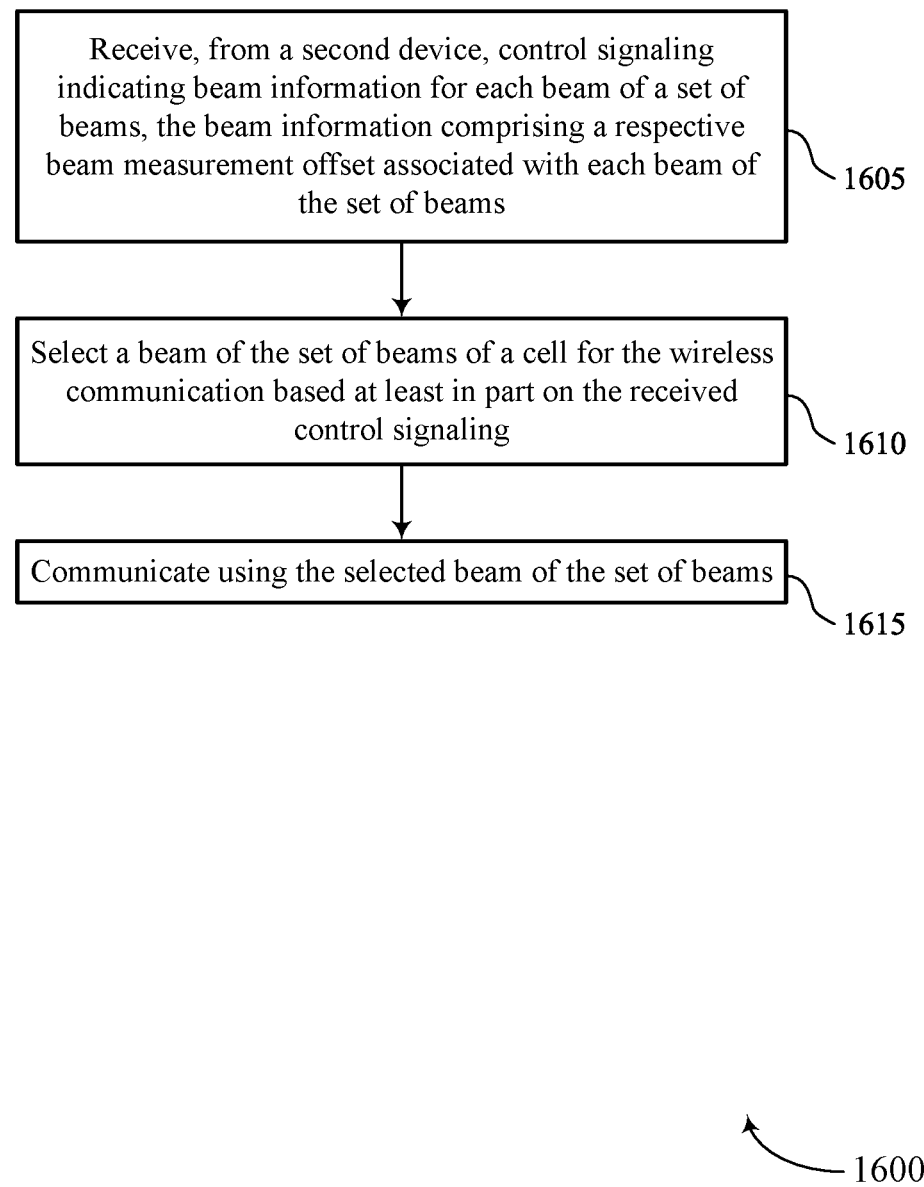

FIG. 16 shows a flowchart illustrating a method 1600 that supports beam-specific KPI indication for serving node selection in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving, from a second device (e.g., a base station 105 or a UE 115), control signaling indicating beam information for each beam of a set of beams, the beam information including a respective beam measurement offset associated with each beam of the set of beams. The operations of 1605 may be performed in accordance with examples as disclosed herein. In some examples, aspects of the operations of 1605 may be performed by an information component 825 as described with reference to FIG. 8.

At 1610, the method may include selecting a beam of the set of beams of a cell for the wireless communication based on the received control signaling. The operations of 1610 may be performed in accordance with examples as disclosed herein. In some examples, aspects of the operations of 1610 may be performed by a beam selection component 835 as described with reference to FIG. 8.

At 1615, the method may include communicating using the selected beam of the set of beams. The operations of 1615 may be performed in accordance with examples as disclosed herein. In some examples, aspects of the operations of 1615 may be performed by a beam selection component 835 as described with reference to FIG. 8.

The following provides an overview of aspects of the present disclosure:

Aspect 1: A method for wireless communication at a first device, comprising: receiving, from a second device, control signaling indicating beam information for each beam of a set of beams associated with a cell, the beam information comprising a set of beam performance metrics associated with each beam of the set of beams associated with the cell; determining that at least one beam performance metric of the set of beam performance metrics associated with a beam satisfies a threshold; selecting the beam of the set of beams for the wireless communication with the cell based at least in part on the at least one beam performance metric satisfying the threshold; and communicating using the selected beam of the set of beams.

Aspect 2: The method of aspect 1, further comprising: receiving, from the second device, second control signaling indicating transmission-reception point information for each transmission-reception point of a set of transmission-reception points, the transmission-reception point information comprising a set of transmission-reception point metrics associated with each transmission-reception point of the set of transmission-reception points, at least one transmission-reception point metric of the set of transmission-reception point metrics satisfying the threshold, wherein selecting the beam of the set of beams for the wireless communication is based at least in part on the received second control signaling.

Aspect 3: The method of aspect 2, further comprising: receiving, from the second device, third control signaling indicating an association between each beam of the set of beams and each transmission-reception point of the set of transmission-reception points.

Aspect 4: The method of any of aspects 1 through 3, further comprising: determining a latency metric for each beam of the set of beams based at least in part on the set of beam performance metrics associated with each beam of the set of beams, wherein selecting the beam of the set of beams for the wireless communication is based at least in part on determining the latency metric for each beam of the set of beams.

Aspect 5: The method of aspect 4, wherein the latency metric comprises a delay for one or both of a downlink or an uplink between the first device and the second device.

Aspect 6: The method of any of aspects 1 through 5, further comprising: determining a throughput metric for each beam of the set of beams based at least in part on the set of beam performance metrics associated with each beam of the set of beams, wherein selecting the beam of the set of beams for the wireless communication is based at least in part on determining the throughput metric for each beam of the set of beams.

Aspect 7: The method of aspect 6, wherein the throughput metric comprises a throughput for one or both of a downlink or an uplink between the first device and the second device.

Aspect 8: The method of any of aspects 1 through 7, further comprising: determining a resource usage for each beam of the set of beams based at least in part on the set of beam performance metrics associated with each beam of the set of beams, wherein selecting the beam of the set of beams for the wireless communication is based at least in part on determining the resource usage for each beam of the set of beams.

Aspect 9: The method of aspect 8, wherein the resource usage comprises one or more of a number of protocol data unit sessions, an average number of protocol data unit sessions, a protocol data unit establishment time, or an average number of successful registration updates.

Aspect 10: The method of any of aspects 1 through 9, further comprising: determining a mobility metric for each beam of the set of beams based at least in part on the set of beam performance metrics associated with each beam of the set of beams, wherein selecting the beam of the set of beams for the wireless communication is based at least in part on determining the mobility metric for each beam of the set of beams.

Aspect 11: The method of aspect 10, wherein the mobility metric comprises one or more of a handover success rate, an average time of handover, or a rate of mobility registration updates.

Aspect 12: The method of any of aspects 1 through 11, further comprising: determining a higher layer reliability metric for each beam of the set of beams based at least in part on the set of beam performance metrics associated with each beam of the set of beams, wherein selecting the beam of the set of beams for the wireless communication is based at least in part on determining the higher layer reliability metric for each beam of the set of beams.

Aspect 13: The method of aspect 12, wherein the higher layer reliability metric comprises one or both of a quality-of-service reliability or a data radio bearer reliability.

Aspect 14: The method of any of aspects 1 through 13, further comprising: determining an energy efficiency metric for each beam of the set of beams based at least in part on the set of beam performance metrics associated with each beam of the set of beams, wherein selecting the beam of the set of beams for the wireless communication is based at least in part on determining the energy efficiency metric for each beam of the set of beams.

Aspect 15: The method of any of aspects 1 through 14, further comprising: determining a physical layer reliability metric for each beam of the set of beams based at least in part on the set of beam performance metrics associated with each beam of the set of beams, wherein selecting the beam of the set of beams for the wireless communication is based at least in part on determining the physical layer reliability metric for each beam of the set of beams.

Aspect 16: The method of aspect 15, wherein the physical layer reliability metric comprises an average number of transmission.

Aspect 17: The method of any of aspects 1 through 16, further comprising: determining an over-the-air load metric for each beam of the set of beams based at least in part on the set of beam performance metrics associated with each beam of the set of beams, wherein selecting the beam of the set of beams for the wireless communication is based at least in part on determining the over-the-air load metric for each beam of the set of beams.

Aspect 18: The method of aspect 17, wherein the over-the-air load metric comprises one or both of a number of devices served by the respective beam or a ratio of utilized time resources to utilized frequency resources.

Aspect 19: The method of any of aspects 1 through 18, wherein the control signaling indicates beam information for the respective beam used to transmit the control signaling, a beam different from the respective beam, or both.

Aspect 20: The method of any of aspects 1 through 18, wherein the control signaling includes a broadcast control signal received at the first device.

Aspect 21: A method for wireless communication at a first device, comprising: receiving, from a second device, control signaling indicating beam information for each beam of a set of beams, the beam information comprising a respective beam measurement offset associated with each beam of the set of beams; selecting a beam of the set of beams of a cell for the wireless communication based at least in part on the received control signaling; and communicating using the selected beam of the set of beams.

Aspect 22: The method of aspect 21, further comprising: receiving, from the second device, second control signaling indicating transmission-reception point information for each transmission-reception point of a set of transmission-reception points, the transmission-reception point information comprising a respective transmission-reception point measurement offset associated with each transmission-reception point of the set of transmission-reception points, wherein selecting the beam of the set of beams for the wireless communication is based at least in part on the received second control signaling.

Aspect 23: The method of aspect 22, further comprising: receiving, from the second device, third control signaling indicating an association between each beam of the set of beams and each transmission-reception point of the set of transmission-reception points, wherein communicating the wireless communication is based at least in part on the received third control signaling.

Aspect 24: The method of any of aspects 21 through 23, further comprising: determining, based at least in part on the beam information, that one or more beams of the set of beams are associated with a neighboring cell, the neighboring cell comprises the cell, and wherein selecting the beam of the set of beams for the wireless communication is based at least in part on determining that a measurement value associated with a respective beam of the one or more beams associated with the neighboring cell satisfies a criterion, the measurement value is based at least in part on a beam measurement offset associated with the respective beam of the neighboring cell.

Aspect 25: The method of aspect 24, further comprising: establishing a connection with the neighboring cell based at least in part on determining that the measurement value associated with the respective beam of the one or more beams associated with the neighboring cell satisfies the criterion, wherein communicating the wireless communication is based at least in part on the established connection with the neighboring cell.

Aspect 26: The method of any of aspects 24 through 25, wherein the measurement value comprises at least one of a reference signal received power value, a reference signal received quality value, or a signal to interference plus noise ratio value.

Aspect 27: The method of any of aspects 21 through 26, wherein the control signaling comprises a system information block.

Aspect 28: The method of any of aspects 21 through 27, wherein selecting the beam of the set of beams for the wireless communication further comprises: selecting a beam associated with a neighboring cell based at least in part on the beam information triggering a handover procedure and determining that a beam measurement offset corresponding to the beam associated with the neighboring cell satisfies a threshold, the neighboring cell comprising the cell.

Aspect 29: The method of aspect 28, further comprising: performing the handover procedure based at least in part on the selected beam being associated with the neighboring cell, wherein communicating the wireless communication is based at least in part on performing the handover procedure.

Aspect 30: A method for wireless communication at a second device, comprising: transmitting, to a first device, control signaling indicating beam information for each beam of a set of beams associated with a cell, the beam information comprising a set of beam performance metrics associated with each beam of the set of beams associated with the cell, wherein at least one beam performance metric of the set of beam performance metrics associated with a beam satisfies a threshold; and communicating using at least one beam of the set of beams based at least in part on the transmitted control signaling.

Aspect 31: The method of aspect 30, further comprising: transmitting, to the first device, second control signaling indicating transmission-reception point information for each transmission-reception point of a set of transmission-reception points, the transmission-reception point information comprising a set of transmission-reception point metrics associated with each transmission-reception point of the set of transmission-reception points, at least one transmission-reception point metric of the set of transmission-reception point metrics satisfying the threshold.

Aspect 32: The method of aspect 31, further comprising: transmitting, to the first device, third control signaling indicating an association between each beam of the set of beams and each transmission-reception point of the set of transmission-reception points.

Aspect 33: The method of any of aspects 30 through 32, wherein each beam of the set of beams is associated with a latency metric for the respective beam.

Aspect 34: The method of aspect 33, wherein the latency metric comprises a delay for one or both of a downlink or an uplink between the first device and the second device.

Aspect 35: The method of any of aspects 30 through 34, wherein each beam of the set of beams is associated with a throughput metric for the respective beam.

Aspect 36: The method of aspect 35, wherein the throughput metric comprises a throughput for one or both of a downlink or an uplink between the first device and the second device.

Aspect 37: The method of any of aspects 30 through 36, wherein each beam of the set of beams is associated with a resource usage for the respective beam.

Aspect 38: The method of aspect 37, wherein the resource usage comprises one or more of a number of protocol data unit sessions, an average number of protocol data unit sessions, a protocol data unit establishment time, or an average number of successful registration updates.

Aspect 39: The method of any of aspects 30 through 38, wherein each beam of the set of beams is associated with a mobility metric for the respective beam.

Aspect 40: The method of aspect 39, wherein the mobility metric comprises one or more of a handover success rate, an average time of handover, or a rate of mobility registration updates.

Aspect 41: The method of any of aspects 30 through 40, wherein each beam of the set of beams is associated with a higher layer reliability metric for the respective beam.

Aspect 42: The method of aspect 41, wherein the higher layer reliability metric comprises one or both of a quality-of-service reliability or a data radio bearer reliability.

Aspect 43: The method of any of aspects 30 through 42, wherein each beam of the set of beams is associated with an energy efficiency metric for the respective beam.

Aspect 44: The method of any of aspects 30 through 43, wherein each beam of the set of beams is associated with a physical layer reliability metric for the respective beam.

Aspect 45: The method of aspect 44, wherein the physical layer reliability metric comprises an average number of transmission.

Aspect 46: The method of any of aspects 30 through 45, wherein each beam of the set of beams is associated with an over-the-air load metric for the respective beam.

Aspect 47: The method of aspect 46, wherein the over-the-air load metric comprises one or both of a number of devices served by the respective beam or a ratio of utilized time resources to utilized frequency resources.

Aspect 48: The method of any of aspects 30 through 47, wherein the control signaling indicates beam information for the respective beam used to transmit the control signaling, a beam different from the respective beam, or both.

Aspect 49: A method for wireless communication at a second device, comprising: transmitting, to a first device, control signaling indicating beam information for each beam of a set of beams, the beam information comprising a respective beam measurement offset associated with each beam of the set of beams; and communicating using at least one beam of the set of beams based at least in part on the transmitted control signaling.

Aspect 50: The method of aspect 49, further comprising: transmitting, to the first device, second control signaling indicating transmission-reception point information for each transmission-reception point of a set of transmission-reception points, the transmission-reception point information comprising a respective transmission-reception point measurement offset associated with each transmission-reception point of the set of transmission-reception points.

Aspect 51: The method of aspect 50, further comprising: transmitting, to the first device, third control signaling indicating an association between each beam of the set of beams and each transmission-reception point of the set of transmission-reception points.

Aspect 52: The method of any of aspects 49 through 51, wherein one or more beams of the set of beams are associated with a neighboring cell, and a measurement value associated with a respective beam of the one or more beams associated with the neighboring cell satisfies a criterion, the measurement value is based at least in part on a beam measurement offset associated with the respective beam of the neighboring cell.

Aspect 53: The method of aspect 52, further comprising: releasing a connection with the first device based at least in part on the measurement value associated with the respective beam of the one or more beams associated with the neighboring cell satisfying the criterion.

Aspect 54: The method of any of aspects 52 through 53, wherein the measurement value comprises at least one of a reference signal received power value, a reference signal received quality value, or a signal to interference plus noise ratio value.

Aspect 55: The method of any of aspects 52 through 54, further comprising: performing a handover procedure based at least in part on the measurement value associated with the respective beam of the one or more beams associated with the neighboring cell satisfying the criterion.

Aspect 56: The method of any of aspects 49 through 55, wherein the control signaling comprises a system information block.

Aspect 57: An apparatus for wireless communication at a first device, comprising a processor; memory coupled with the processor; and instructions stored in the memory and executable by the processor to cause the apparatus to perform a method of any of aspects 1 through 19.

Aspect 58: An apparatus for wireless communication at a first device, comprising at least one means for performing a method of any of aspects 1 through 19.

Aspect 59: A non-transitory computer-readable medium storing code for wireless communication at a first device, the code comprising instructions executable by a processor to perform a method of any of aspects 1 through 19.

Aspect 60: An apparatus for wireless communication at a first device, comprising a processor; memory coupled with the processor; and instructions stored in the memory and executable by the processor to cause the apparatus to perform a method of any of aspects 21 through 29.

Aspect 61: An apparatus for wireless communication at a first device, comprising at least one means for performing a method of any of aspects 21 through 29.

Aspect 62: A non-transitory computer-readable medium storing code for wireless communication at a first device, the code comprising instructions executable by a processor to perform a method of any of aspects 21 through 29.

Aspect 63: An apparatus for wireless communication at a second device, comprising a processor; memory coupled with the processor; and instructions stored in the memory and executable by the processor to cause the apparatus to perform a method of any of aspects 30 through 48.

Aspect 64: An apparatus for wireless communication at a second device, comprising at least one means for performing a method of any of aspects 30 through 48.

Aspect 65: A non-transitory computer-readable medium storing code for wireless communication at a second device, the code comprising instructions executable by a processor to perform a method of any of aspects 30 through 48.

Aspect 66: An apparatus for wireless communication at a second device, comprising a processor; memory coupled with the processor; and instructions stored in the memory and executable by the processor to cause the apparatus to perform a method of any of aspects 49 through 56.

Aspect 67: An apparatus for wireless communication at a second device, comprising at least one means for performing a method of any of aspects 49 through 56.

Aspect 68: A non-transitory computer-readable medium storing code for wireless communication at a second device, the code comprising instructions executable by a processor to perform a method of any of aspects 49 through 56.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Also, as used herein, the phrase "a set" shall be construed as including the possibility of a set with one member. That is, the phrase "a set" shall be construed in the same manner as "one or more."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
   one or more memories storing processor-executable code; and
   one or more processors coupled with the one or more memories and individually or collectively operable to execute the code to cause the UE to:
      receive, from a service providing node, control signaling comprising a plurality of sets of beam performance metrics, wherein each beam of a set of beams associated with a cell is associated with a respective set of beam performance metrics of the plurality of sets of beam performance metrics, the respective set of beam performance metrics comprising one or more of: a latency metric, a throughput metric, a resource usage metric, a mobility metric, a higher layer reliability metric, a physical layer reliability metric, an energy efficiency metric, or an over-the-air load metric;
      determine that a value of at least one received beam performance metric of the respective set of beam performance metrics indicated for a beam of the set of beams satisfies a threshold;
      select the beam of the set of beams for the wireless communication with the cell based at least in part on the value of the at least one received beam performance metric satisfying the threshold; and
      communicate using the selected beam of the set of beams.

2. The UE of claim 1, wherein the one or more processors are individually or collectively further operable to execute the code to cause the UE to:
   receive, from the service providing node, second control signaling indicating transmission-reception point information for each transmission-reception point of a set of transmission-reception points, the transmission-reception point information comprising a set of transmission-reception point metrics associated with each transmission-reception point of the set of transmission-reception points, at least one transmission-reception point metric of the set of transmission-reception point metrics satisfying the threshold, wherein the beam of the set of beams for the wireless communication is selected based at least in part on the received second control signaling.

3. The UE of claim 2, wherein the one or more processors are individually or collectively further operable to execute the code to cause the UE to:
   receive, from the service providing node, third control signaling indicating an association between each beam of the set of beams and each transmission-reception point of the set of transmission-reception points.

4. The UE of claim 1, wherein the respective set of beam performance metrics comprises at least the latency metric, and wherein the beam of the set of beams for the wireless communication is selected based at least in part on the latency metric for each beam of the set of beams.

5. The UE of claim 4, wherein the latency metric comprises a delay for one or both of a downlink or an uplink between the UE and the service providing node.

6. The UE of claim 1, wherein the respective set of beam performance metrics comprises at least the throughput metric, and wherein the beam of the set of beams for the wireless communication is selected based at least in part on the throughput metric for each beam of the set of beams.

7. The UE of claim 6, wherein the throughput metric comprises a throughput for one or both of a downlink or an uplink between the UE and the service providing node.

8. The UE of claim 1, wherein the respective set of beam performance metrics comprises at least the resource usage metric, and wherein the beam of the set of beams for the wireless communication is selected based at least in part on the resource usage metric for each beam of the set of beams.

9. The UE of claim 8, wherein the resource usage metric comprises one or more of a number of protocol data unit sessions, an average number of protocol data unit sessions, a protocol data unit establishment time, or an average number of successful registration updates.

10. The UE of claim 1, wherein the respective set of beam performance metrics comprises at least the mobility metric, and wherein the beam of the set of beams for the wireless communication is selected based at least in part on the mobility metric for each beam of the set of beams.

11. The UE of claim 10, wherein the mobility metric comprises one or more of a handover success rate, an average time of handover, or a rate of mobility registration updates.

12. The UE of claim 1, wherein the respective set of beam performance metrics comprises at least the higher layer reliability metric, and wherein the beam of the set of beams for the wireless communication is selected based at least in part on the higher layer reliability metric for each beam of the set of beams.

13. The UE of claim 12, wherein the higher layer reliability metric comprises one or both of a quality-of-service reliability or a data radio bearer reliability.

14. The UE of claim 1, wherein the respective set of beam performance metrics comprises at least the energy efficiency metric, and wherein the beam of the set of beams for the wireless communication is selected based at least in part on the energy efficiency metric for each beam of the set of beams.

15. The UE of claim 1, wherein the respective set of beam performance metrics comprises at least the physical layer reliability metric, and wherein the beam of the set of beams for the wireless communication is selected based at least in part on the physical layer reliability metric for each beam of the set of beams.

16. The UE of claim 15, wherein the physical layer reliability metric comprises an average number of transmissions.

17. The UE of claim 1, wherein the respective set of beam performance metrics comprises at least the over-the-air load metric, and wherein the beam of the set of beams for the wireless communication is selected based at least in part on the over-the-air load metric for each beam of the set of beams.

18. The UE of claim 17, wherein the over-the-air load metric comprises one or both of a number of devices served by a respective beam or a ratio of utilized time resources to utilized frequency resources.

19. The UE of claim 1, wherein the control signaling indicates beam information for a respective beam used to transmit the control signaling, a beam different from the respective beam, or both.

20. The UE of claim 1, wherein the control signaling comprises a broadcast control signal received at the UE.

21. A user equipment (UE) for wireless communication, comprising:
one or more memories storing processor-executable code; and
one or more processors coupled with the one or more memories and individually or collectively operable to execute the code to cause the UE to:
receive, from a service providing node of a cell, control signaling indicating a respective beam measurement offset associated with each beam of a set of beams associated with at least the cell, the respective beam measurement offset applied to one or more measurement quantities associated with the cell;
select a beam of the set of beams for the wireless communication based at least in part on the received control signaling indicating the respective beam measurement offset associated with each beam of the set of beams; and
communicate using the selected beam of the set of beams.

22. The UE of claim 21, wherein the one or more processors are individually or collectively further operable to execute the code to cause the UE to:
receive, from the service providing node, second control signaling indicating transmission-reception point information for each transmission-reception point of a set of transmission-reception points, the transmission-reception point information comprising a respective transmission-reception point measurement offset associated with each transmission-reception point of the set of transmission-reception points, wherein the beam of the set of beams for the wireless communication is selected based at least in part on the received second control signaling.

23. The UE of claim 22, wherein the one or more processors are individually or collectively further operable to execute the code to cause the UE to:
receive, from the service providing node, third control signaling indicating an association between each beam of the set of beams and each transmission-reception point of the set of transmission-reception points, wherein the wireless communication is communicated based at least in part on the received third control signaling.

24. The UE of claim 21, wherein the set of beams are associated with the cell and a neighboring cell, and wherein the one or more processors are individually or collectively further operable to execute the code to cause the UE to:
determine, based at least in part on the control signaling, that one or more beams of the set of beams are associated with the neighboring cell, wherein the beam of the set of beams for the wireless communication is selected based at least in part on a measurement value associated with a respective beam of the one or more beams associated with the neighboring cell satisfying a criterion, the measurement value is based at least in part on a beam measurement offset associated with the respective beam of the neighboring cell.

25. The UE of claim 24, wherein the one or more processors are individually or collectively further operable to execute the code to cause the UE to:
establish a connection with the neighboring cell based at least in part on determining that the measurement value associated with the respective beam of the one or more beams associated with the neighboring cell satisfies the criterion, wherein the wireless communication is communicated based at least in part on the established connection with the neighboring cell.

26. The UE of claim 24, wherein the measurement value comprises at least one of a reference signal received power value, a reference signal received quality value, or a signal to interference plus noise ratio value.

27. The UE of claim 21, wherein the set of beams are associated with the cell and a neighboring cell, and wherein, to select the beam of the set of beams for the wireless communication, the one or more processors are individually or collectively operable to execute the code to cause the UE to:
select a beam associated with the neighboring cell based at least in part on the control signaling triggering a handover procedure and determining that a beam measurement offset corresponding to the beam associated with the neighboring cell satisfies a threshold.

28. The UE of claim 27, wherein the one or more processors are individually or collectively further operable to execute the code to cause the UE to:
perform the handover procedure based at least in part on the selected beam being associated with the neighboring cell, wherein the wireless communication is communicated based at least in part on performing the handover procedure.

29. A service providing node for wireless communication, comprising:
one or more memories storing processor-executable code; and
one or more processors coupled with the one or more memories and individually or collectively operable to execute the code to cause the service providing node to:
transmit, to a UE, control signaling comprising a plurality of sets of beam performance metrics, wherein each beam of a set of beams associated with a cell is associated with a respective set of beam performance metrics of the plurality of sets of beam performance metrics, wherein the respective set of beam performance metrics comprising one or more of: a latency metric, a throughput metric, a resource usage metric, a mobility metric, a higher layer reliability metric, a physical layer reliability metric, an energy efficiency metric, or an over-the-air load metric, and wherein a value of at least transmitted one beam performance metric of the respective set of beam performance metrics indicated for a beam of the set of beams satisfies a threshold; and communicate using at least one beam of the set of beams based at least in part on the transmitted control signaling.

30. A service providing node for wireless communication, comprising:

one or more memories storing processor-executable code; and one or more processors coupled with the one or more memories and individually or collectively operable to execute the code to cause the service providing node to:

transmit, to a UE, control signaling indicating a respective beam measurement offset associated with each beam of a set of beams associated with at least a cell of the service providing node, the respective beam measurement offset applied to one or more measurement quantities associated with the cell; and communicate using at least one beam of the set of beams based at least in part on the transmitted control signaling.

\* \* \* \* \*